United States Patent [19]

Godbold et al.

[11] Patent Number: 4,733,391

[45] Date of Patent: Mar. 22, 1988

[54] COMMUNICATION NETWORKS

[75] Inventors: Robert J. Godbold; Peter R. Kirk, both of Chelmsford; Nicholas H. Pope, Billericay; John A. Pye, Braintree, all of Great Britain

[73] Assignee: The General Electric Company plc, London, England

[21] Appl. No.: 744,010

[22] PCT Filed: Oct. 22, 1984

[86] PCT No.: PCT/GB84/00356

§ 371 Date: Jun. 7, 1985

§ 102(e) Date: Jun. 7, 1985

[87] PCT Pub. No.: WO85/01850

PCT Pub. Date: Apr. 25, 1985

[30] Foreign Application Priority Data

Oct. 22, 1983 [GB] United Kingdom ............... 8328317

[51] Int. Cl.⁴ .............................................. H04J 3/02
[52] U.S. Cl. ......................................... 370/88; 370/89
[58] Field of Search ...................... 370/89, 86, 88, 94, 370/60, 58; 340/825.05

[56] References Cited

U.S. PATENT DOCUMENTS 4,032,893  6/1977  Moran .................................. 370/86
4,393,497  7/1983  Cantwell .............................. 370/89
4,399,531  8/1983  Grande et al. ........................ 370/94

FOREIGN PATENT DOCUMENTS

62960A1   10/1982  European Pat. Off. .
99978A2    2/1984  European Pat. Off. .
109964A1   6/1984  European Pat. Off. .
1570923    1/1980  United Kingdom .
2027564A   2/1980  United Kingdom .
2028062A   2/1980  United Kingdom .
2049357A  12/1980  United Kingdom .

OTHER PUBLICATIONS

Grnarov et al, "A Highly Reliable, Distributed Loop Network Architecture," Digest of Papers FTCS-10 (Oct. 1-3, 1980), pp. 319-324.

Goyal et al, "Reliability in Ring Networks," Compcom 82 (Sep. 20-23, 1980), pp. 444-453.

Primary Examiner—Douglas W. Olms
Attorney, Agent, or Firm—Spencer & Frank

[57] ABSTRACT

Communication networks, specifically network topologies and apparatus therefor suitable for data communication between computers, tend to be of three main types—those with a star topology (the older sort), those with a bus topology, and those with a ring topology. The ring topology networks have many advantages, but their simpler forms are highly vulnerable to link or repeater failure. The invention proposes another ring network system, which is particularly resilient to repeater and/or link failure, and which is based upon the use of a multiplicity of inter-link repeater units each capable of being connected by communication IN-/OUT port pairs to a suitable combination of IN/OUT lines (by which it is connected to other repeater units) by internal switching such that regardless of the actual physical-disposition interconnection arrangement of the units relative to one another the network may be configured as a ring by suitably internally connecting each such unit's communication port pairs so as to form a circular communications link serially joining all of the units in the network.

25 Claims, 30 Drawing Figures

COMMUNICATION NETWORKS

BACKGROUND OF THE INVENTION

This invention concerns communication networks, and relates in particular to novel network topologies and apparatus therefor suitable for data communication between computers.

THE BACKGROUND

Although means for connecting large, mainframe, computers both to their own equipment—terminals, tapereaders, disk stores, printers, and so on—and to other large computers have been known for many years there has, following the introduction of minicomputers and (especially) micro-computers, been a very considerable resurgence of interest in networked communication systems (networks) interconnecting not only all sorts of computers and their ancillary equipment but also computer-driven devices such as word processors and process control apparatus. Indeed, this interest extends to the use of networks to carry all sorts of information signals, including voice and picture information (usually in digital form); for convenience, however, this Specification refers hereinafter to networks in terms of computer networks, without any intention of excluding other types.

One type of new network is designed primarily for use in connecting machines within a small area—an office, a building, or perhaps several buildings in the same locality—and so is known as a "local area network" (LAN). Though the many available types of local area network are usually different from the older networks used with large computers, there is no reason why they should not incorporate one or more large computers, and indeed it is generally the case that they do.

The hardware—the actual apparatus—of any computer network will in general comprise a number of stations joined to each other in one of a small number of topological ways by the network connecting medium (which is commonly a twisted-wire pair, a coaxial cable or an optical fibre). At each station there will normally be an interface unit connected between the network medium and one or more computer or computer peripheral device. Just how the coupling between the interface unit and the connecting medium is actually made depends to a large extent upon the topology type used for the network (star, bus and ring topologies are discussed further hereinafter). In ring networks, the variety with which this invention is primarily concerned, each interface unit is coupled into the network by a specialized switching device known as a repeater unit (because it receives signals from the network ring on its IN side, passes them, if appropriate, to the attached interface unit, and then "repeats" the signals to the ring on its OUT side—usually by generating a copy that it transmits on to the ring.

A network needs both the apparatus and some form of unified control system so that the various hardware components can actually understand the signals each transmits to the others. While it is the job of each interface unit to convert signals on the network into a form immediately useable by the equipment connected to that interface (and vice versa), the task is only really possible if the network signals are in some sort of standard form, in accordance with rules defining how the entire system is to operate. These rules are referred to as "protocols", and there are a number of types of protocol, these together governing all aspects of system operation. Both the hardware specific to the network itself and the protocols governing how the whole system should function depend to a very large extent upon the topology of the network—that is to say, upon the manner in which the individual components are joined one to another in space. Local area networks—for the most part the term "network" is used hereinafter to mean a local area network, though the invention extends to other kinds of networks—generally have one or a "combination" of three main topologies, known as the star, bus and ring topologies.

PRIOR ART NETWORKS

Networks with a star topology are the older sort of networks. Like the telephone subscribers connected to a single telephone exchange, star networks have a central switching point to which outlying stations are connected and which control how any one such station is connected to any other. Though they are popular, they rely on the correct operation of a single highly complex switch, and are thus prone to disastrous failure. More recently, networks with a bus topology, where the stations are simply connected to a single unbroken length of transmission medium, have come to the fore. Though the bus concept is laudably simple there are drawbacks. Specifically, the interface to the bus requires complex analogue hardware, careful positioning of access points, and limits on branching and physical size; also, most such networks use a probabilistic contention-based method for access to the bus, and such methods are generally considered to be both unreliable at high utilisation and unsuitable for time-critical applications such as voice communication. The third type of topology is the ring (with which the present invention is especially concerned), in which all the stations are linked (both physically and as regard their signal-passing capability) serially one to the next in a circle, or closed loop (the ring), and data is passed around the ring, from one station to the next, till it reaches its destination. The ring topology has many advantages over the bus topology. For example: there may be employed simpler means (line drivers and receivers) to transmit data between stations, because there is only one transmitter means on each link; there is much less restriction on dimensions, because the limits apply to individual links rather than the whole network; and extension to fibre optic technology is relatively straightforward. Also, the topology lends itself to deterministic access protocols (the three basic types of ring use one or another of what have become known as the token, empty slot and register insertion protocols) which can offer guaranteed minimum throughput, which is particularly important for real-time applications such as voice transmission.

Simple ring networks do, however, have one big disadvantage: because the operation of a ring is inherently dependent upon data being passed on round the ring from one station to the next, each station receiving the data and then re-transmitting it, active repeaters are required at regular intervals around the ring, at least one at each station, and the basic network will fail completely both if any one repeater fails and also if any one link in the ring is broken.

A number of different steps have been taken to deal with this problem. For example, one "simple" solution is to reduce by various means the likelihood of repeater failure. Another (and in practice even simpler) is to provide a bypass at each repeater with a relay that must be held on actively by the repeater if it is to stay in the ring; if the repeater fails the relay operates and the ring bypasses that repeater. In a modification of this method, which alows for link failure, the ring is squashed into a shape like that of the outline of a starfish (though topologically it remains a ring), with all the relays at a central location. Another, and similar, bypass method provides an extra link between each pair of repeaters normally separated by only one intervening repeater; if any intervening repeater fails, or if the links leading out of it fail, the next repeater switches to taking its input through the extra link from the repeater before last, thus isolating the failed repeater or link. Yet another variation on the bypass theme uses a complete set of spare links passing all the way around the ring "parallel" to the normal links, to which spare links are conected certain of the main ring repeaters. These can detect whether there is a break in the main ring upstream of them; if a break is detected, the nearest of the special repeaters downstream of the break will "loop back", i.e. take its input not from the link leading to the break but from the spare link entering it from the opposite direction, and will signal to the next specialisted repeater upstream from the break to send its output not along the link leading to the break but back along the spare links (this reverse signal passes unchanged through the other repeaters). Thus, after a failure this type of ring becomes a "squashed ring" having a linear sequence of stations each connected to the next by both an out and a return link.

SUMMARY OF THE INVENTION

Each of these suggested ring networks has advantages and disadvantages, even though in each case the network system has attempted to overcome the problems of the previous designs. The present invention provides another ring network system, which is particularly resilient to repeater and/or link failure, and which is based upon the use of a multiplicity of inter-linked repeater units each capable of being connected to a suitable combination of IN/OUT lines (by which it is connected to other repeater units) by internal switching means that are preferably responsive to the presence or absence of a signal upon its IN lines. The invention also provides a method of configuring such a network (and other, similar, networks) upon start up, and of re-configuring the network during operation should any part thereof become faulty.

The Inventive Network

In one aspect, therefore, this invention provides a communications network which includes a multiplicity of interconnected switch units, wherein:

each switch unit has a plurality of communication port pairs each comprising an OUT and an IN port, selected units having at least three such pairs;

via their respective port pairs, each switch unit is connected to at least one other switch unit by a communication path, there being at least one path to each such other unit, each path comprising an OUT and an IN channel, each of a number of selected units being so connected by at least three paths to other units; and for each switch unit its OUT and IN ports are internally interconnectable such that if there is no port pair that must be involved in this interconnection, and is thus a mandatory pair, then the OUT port of any pair can be connected to the IN port of any pair, while if there is such a mandatory port pair then the unit's port pairs are in a notional sequence with the mandatory pair at one end, and the OUT port of any non-mandatory pair can at least be connected either to the IN port of that pair or to the IN port of any of the port pairs sequentially nearer the mandatory pair, and the OUT port of the mandatory port pair can be connected to the IN port of any non-mandatory pair;

whereby with the provisos above, the switch units are capable of being interconnected via their non-mandatory port pairs one with another in an entirely arbitrary arrangement, and regardless of the actual physical-disposition interconnection arrangement of the units relative one to another the network may be configured as a ring by suitably internally interconnecting each such unit's communication port pairs so as to form a circular communications link serially joining all of the units in the network; and wherein in operation there are employed both channels of each of the communication paths that are used in the configured network.

As is dealt with in more detail hereinafter, no distinction is necessarily made between the various port pairs in a switch unit, and each is capable of connection via a communication path either to another unit or to a station. However, a distinction may be made, and a particular port pair may be allotted to a station, the pair's inclusion in the network being mandatory. A single mandatory port pair may lead to a series of stations (as though the switch unit had a similar series of adjacent, internally connected, mandatory port pairs).

The inventive network comprises a multiplicity of interconnected switch units. The term "multiplicity" is here used to mean at least three, and indeed the network might comprise three only switch units. However, preferably there will be at least four units (this is discussed further hereinafter), and most commonly there will be many more units—possibly as many as several hundred, though networks having from ten to fifty or so switch units will generally be the norm.

Each switch unit employed in the inventive network has a plurality of communication port pairs. These port pairs allow the unit both to be connected to other switch units via the communication paths (normally one port pair plus one path per each other unit, though, as discussed further hereinafter, two units may be interconnected by two paths one to each of two port pairs in each unit) and also—it being the prime purpose of the network to allow a number of computers and/or computer peripheral devices to be interconnected—to be connected via an additional cummunication path to an interface station itself directly or indirectly connected to, or even forming an integral part of, one or more computer/device. The term "plurality", as applied to the number of port pairs for each switch unit, has its normal significance, and thus means "at least two". Two only port pairs allow the unit to be connected to two other units or to one other unit and one interface station; while not useless, neither possibility is particularly useful, so it is preferred that each unit have at least three port pairs. Three port pairs, for example, allow the unit to be connected either to three other units (so being a junction within the network) or two two other units and an interface station. Most preferably, however, each unit has four port pairs, enabling it for example to be connected simultaneously to three other units and an interface station. Moreover, while it is not inconceivable to have each unit connected to more than four other units/interface stations, this possibility seems at present to be unnecessary, and needlessly complicated. Preferably, therefore, all the units are the same in that each has four only port pairs.

Each switch unit is connected to at least one other unit by a commmunication path (there being a separate path between each pair of connected units) extending between a port pair of the one unit and a port pair of the other unit. The path comprises two channels, along one of which signals on that path are fed to the switch unit, and along the other of which signals on that path are sent from the switch unit. Each channel may take any physical form, and may thus be a conductive wire, a radio link, a fibre optic system, and so on (normally they will both be the same). For local area networks the majority of path channels will be either fibre optic systems or conductive wires (possibly "twisted" wire pairs, posibly coaxial cable of one sort or another), but for networks extending over larger areas and distances—which are thus not "local area" networks—the path channels may be microwave radio links (possibly via satellite over very long distances).

It will be clear, incidentally, that neither the paths themselves nor the two channels for each path need be physically separate: a single physical link (one wire or one optical fibre, for example) could be used provided that the signal carried can be allocated to the relevant path and then identified as IN or OUT, and sent to the correct port of the appropriate switch unit's port pair. Such a single physical link is most likely to be employed where the link medium is a radio communications channel.

In its broadest form the inventive network requires that each switch unit be connected by at least one communication pathway to each of at least one other switch unit, and that some switch units are so connected by at least three paths to other units. While it is intended that the inventive networks should include those wherein two units are joined one to the other not merely by one path but by two or more, it will more often be the case that the paths from any one of the selected units join that unit to as many other units as there are paths—thus, each path leads to a different unit—for this allows the network to include branch-type junctions in its physical (topographical) layout despite its topological ring form as regards its communication capabilities. Thus, very preferably each of the selected units is connected by communication paths to at least three other units (and in such a case it is clearly necessary for the network to contain a minimum of four units).

Each switch unit is connected by a communication path to at least one other unit, and preferably selected units are connected to at least three other units. In practice only a few units will in fact be connected to three (or more) other units, for the network will typically consist of a coarse mesh of several long linear chains of units that are themselves interconnected at strategic points. In this latter case, some of the chains will be free at one end (the end unit thus being connected to one only other unit) and joined at the other, while others will be joined at both ends (at each joined end is a unit connected to at least three other units).

Another typical physical layout is rather like a ladder, with two long linear chains joined at intervals (and at the ends) by cross-links.

As pointed out hereinbefore, no distinction is necessarily made between a switch unit's port pairs. However, for various reasons one (or more) port pair of a switch unit may be singled out for a special purpose that makes mandatory the pair's involvement in the internal interconnections of the switch unit. A typical instance would be when the pair is dedicated to a station. In general a station can be connected via the communication path to any port pair, but it is frequently advantageous to provide a special capability associated with one particular port pair such that the network is not disturbed by the connection to or disconnection from that pair of the station (or, indeed, any equipment) connectable to it. Dedicating such a port pair to a station, and arranging that in the effective absence of the station there may be made a direct connection between the pair's OUT and IN ports so as to bridge the two and thus bypass the normal, indirect, connection via the OUT and IN channels, allows the station to be switched on and off without in any way disturbing the network—and, specifically, without necessitating network reconfiguration. Naturally, where a switch unit includes a port pair whose inclusion is mandatory then the unit's internal interconnection capability must ensure that that particular port pair (or those pairs, if there are more than one) is connectable to any of the other port pairs. This may be achieved quite simply by arranging the notional sequence of port pairs such that any mandatory pair is at either the beginning or the end; provided that the OUT port of any port pair can indeed be internally interconnected with the IN port of any of the port pairs sequentially nearer the mandatory pair, and that the OUT port of the mandatory port pair can be connected to the IN port of any non-mandatory port pair, then each mandatory port pair will always be included. The notional sequence—being purely notional—can therefore start with the mandatory port pair, so that the OUT port of any subsequent pair must be interconnectable to the IN port of any preceding non-mandatory port pair, or it may end with the mandatory port pair, so that the OUT port of any previous pair must be interconnectable to the IN port of any subsequent non-mandatory port pair. In most of the discussions hereinafter the latter type of notional sequence, ending with the mandatory pair, is employed.

The minimum internal interconnection capability of a switch unit having a mandatory port pair is that the OUT port of any pair in the notional sequence can be interconnected with its own IN port or with the IN port of any of the port pairs nearer the mandatory pair, the mandatory pair's OUT port being connectabale to any non-mandatory pair's IN port. If the actual interconnection capability is this minimum, then the notional sequence becomes in effect an actual sequence. However, while the actual capability could be this minimum, it may well be more convenient to allow any OUT port to be interconnected with any IN port, even if in operation some of the possible interconnections are never used (or even forbidden). In this case it will be evident that the port pairs may not be arranged in any real sequence, and there will be a plurality of equivalent notional sequences in which the minimum interconnection capability requirements are satisfied.

The switch unit internal interconnectability required is such that there may be taken any set of its OUT and IN port pairs (including any mandatory pair), and these pairs can be interconnected in a closed loop. The interconnectability already defined (which achieves this end) may alternatively be defined to be that where for each unit its OUT and IN ports are internally interconnectable in a number of connection combinations in all of which a plurality of the port pairs are sequentially arranged in a closed loop, the IN port of any one being connected to the OUT port of the next, and there may be a port pair for which it is mandatory that it be included in this sequence.

The Switch Unit

One of the major features of the inventive network is the use of switch units whose communication port pairs can be interconnected internally of the unit so that if no port pair is mandatory then the OUT port of any pair can be connected to the IN port of any pair—that is, it can be connected either to the IN port of its own pair or to the IN port of any other pair. The internal arrangement of the switch unit will commonly be such that the port pairs are sequentially disposed, and preferably provides for any OUT port to be connected directly to any IN port. In an alternative arrangement, in which the number of combinations of connections between ports is restricted but all the combinations used in the preferred configuration method described hereinafter are possible, the port pairs are sequentially disposed in a closed loop, and a signal is passed from each port pair to the sequentially succeeding port pair, in such a way that the OUT port of each pair may be connected either to the IN port of that pair or to the signal passed from the preceding port pair (and thus connected indirectly to the IN port of that port pair or the IN port of a preceding port pair), and the signal passed to the succeeding port pair may be either that received at the IN port of that port pair or that passed from the preceeding port pair.

While in theory there can be a number of different kinds of switch unit, and each may have as few or as many IN/OUT port pairs as is required for the particular job that it is to perform, it is—as discussed hereinbefore—most convenient if all the switch units are the same, and have at least four, and very preferably four only, port pairs one of which is a mandatory port pair. The actual construction of such a switch unit might be thought to be relatively simple once the concept has been defined, but clearly some designs will be more useful than others. The present invention preferably employs one form of switch unit having at least four communication IN/OUT port pairs one of which is mandatory, which unit comprises:

(a) switching means associated with each IN/OUT port pair, each of which switching means may be regarded as being notionally a multiway switch having a wiper blade connected to a centre contact and moveable into engagement with any one of a multiplicity of outer contacts so as to connect the centre contact thereto, the centre contact being connected to the OUT port of the port pair and the outer contacts being connected, one each, to the IN port of the same port pair and to the IN ports of the relevant other port pairs, with the proviso that the connections to the IN port of the mandatory port pair are made via a common switching means allowing the connections to be made instead to the OUT port of the mandatory port pair, whereby by appropriately setting the switching means the OUT port of any port pair may be connected through the wiper blade to the IN port of any relevant port pair;

(b) control means for determining for each switching means with which of the outer contacts the wiper is to be engaged, and thus to which of the IN ports the switching means' centre contact is to be connected, and for determining for the mandatory port pair bypass switching means whether the connections to its IN port are made instead to the OUT port; and, (c) signal detect means associated with the IN port of each non-mandatory port pair and providing data to the control means in dependence upon which is in part made the determination of which contacts are to be connected.

Another preferred form of switch is similar, but may be regarded not as a multiway wiper blade switch but as a cross-over switch having two wiper blades each connected to a contact designated an OUT contact and each moveable into engagement with either of two contacts designated an IN contact, one of the OUT contacts being connected to the OUT port of the associated port pair and one of the IN contacts being connected to the IN port of the same port pair, and the second OUT contact being connected to the second IN contact of the cross-over switch associated with the sequentially succeeding port pair in the switch unit (the port pairs in the unit being in this case notionally sequentially disposed in a closed loop), with the proviso that in this case the cross-over switch associated with the special port pair may optionally be replaced by direct connections between the OUT port of this port pair and the second OUT contact of the sequentially preceding cross-over switch and between the IN port and the second IN contact of the sequentially succeeding cross-over switch.

The switching means has been described in terms of two simple analogues of mechanical switches for making electrical connections. While naturally it could be either of such analogues, in practice it is (for electrical connections) most preferably a comparable solid state, semiconductor, device, which by its very nature is fast enough and reliable enough for use in a switch unit employed within a computer network. It is not impossible, however, for the switch unit to employ non-electrical switching means—optical switches might best suit units connected to other units by optical fibres—and in general the switching means will be any appropriate to the task, even if it is described herein as a mechanical analogue of an electrical switch.

Each switching means has a multiplicity of outer contacts connected to the IN ports of the relevant port pairs (including, of course, the IN port of its own port pair). Which port pairs are relevant depends, naturally, on with which port pairs the switching means is associated; the matter of the interconnectability of the port pairs is discussed hereinbefore, and no more need be said here.

In a particularly preferred embodiment of a switch unit described in more detail hereinafter there are means for generating signals—"query-connect" signals (also known as "probing signals") and "start-up" signals—used while configuring the network (it is preferred that it be the configuration initiating switch unit that generates the start-up signal, and that this signal be passed in turn to each other switch unit used in the network—as discussed further hereinafter). These signals need be supplied directly or indirectly to each port pair. In addition, it is desirable if each port pair's OUT port can simply be left unconnected. For both these reasons, therefore, it is very much preferred if, in addition to the outer contacts connected to the IN ports of the relevant port pairs, each wiper blade analogue switching means has two extra outer contacts connected one each to the "query-connect" signal generator and to nothing. If there is no mandatory port pair then there should also be an extra outer contact connected to the "start-up" signal generator, while if there is a mandatory port pair then only its wiperblade-analogue switching means needs an outer contact connectable to the "start-up" signal generator.

Moreover, it is especially preferred that each switch unit include, associated with its mandatory port pair, a quite separate control port through which may be sent control signals from the station connected via the communications pathway to the mandatory port pair. As explained hereinafter, signals transmitted through this port from the associated station can, for example, either "initialize" the switch unit at the beginning of the configuration procedure, or cause the switch unit to adopt some pre-set configuration preferentially during the next following configuration procedure.

In order that the introduction or removal of a station at the mandatory port pair of a switch unit should not disturb the network, switching means are included, associated with the port pair, allowing there to be made a direct connection between the pair's OUT and IN ports so as to bridge the two and thus bypass the port pair. Of course, the bypass will be associated with signal delay means to replace any delay inherently introduced by the station and the pathway leading thereto.

Each OUT or IN port has so far been regarded as though it were a single terminal, to which is connectable the channel on the switch-unit-external side and another pair OUT or IN port on the switch-unit-internal side. Indeed, it may be just such a single terminal. However, in some cases it may be desirable physically to separate the external and internal sides of either port, though keeping them electrically connected. It may, indeed, be desirable to separate the two sides of a port both physically and electrically by placing a switched connecting link between the two. This is specifically so in the case of the mandatory port pairs, where it is desirable to be able to bridge the inner sides of the two ports while at the same time disconnecting the link between the inner and outer sides of either (or both) port, for by so doing tnere may be prevented signal corruption arising from such factors as interaction between a signal passing along the bypass and any signal that may exist on either channel, and impedance mismatch effects.

The control means determines how each switching means is to be set—and thus how the switch unit is to be internally interconnected. The control means conveniently comprises a device, such as a ROM chip, capable of storing, and recalling, a collection of predetermined combinations of switching means settings. The particular combination that is recalled is determined in part by the output states of the signal detect means and in part by control signals from the station at the other end of the communication pathway connected to the switching units mandatory port pair. Once recalled, it is employed to actuate the switching means to set themselves in the defined manner. In one preferred embodiment control signals from the station associated with the switch unit may be employed to force the use of a particular switching means interconnection combination, thus ensuring that a specified one or more of the switching means associated with the non-mandatory port pairs of the switch unit will be set into the 'looped back' condition (i.e. the OUT port of the port pair will be connected to the IN port of the same port pair).

The signal detect means is means for detecting the presence or the absence of a signal at the IN port of the associated port pair. The signal may be one of a number of types. During operation of the network it will, of course, be any signal of the type used for data transmission within the network, and the absence of signal, when detected, initiates network shutdown leading to re-configuration. During configuration the signal will, as explained in more detail below, be the query-connect signal or start-up signal, and while these may be detected and interpreted as two distinct, particular signals, it is satisfactory to detect and interpret one particular signal as the start-up signal and to interpret any other (non-start-up) signal as the query connect signal.

Repeater Units

A ring network is, as has been stated hereinbefore, a number of stations joined so far as concerns their signal-passing capability) to each other in a circle, or closed loop, by the links of the network connecting medium, the coupling together of the network links being effected by a series of repeater units. The switch unit used in the present invention is that part of the arrangement that makes the connections between links, and for the most part is referred to herein simply as the "switch unit". However, it is preferable that in practice the switch unit (and its associated control means and signal detect means) be a repeater unit, this having additional capabilities over and above merely making the desired connections, and this latter term is also used hereinafter where it is more appropriate.

Within each repeater unit each switching means is appropriately connected to the various IN and OUT ports of the relevant port pairs. Though these connections might be direct, for use within a computer network (where the signals being switched will be weak digital ones) it is in fact much preferred if the connection be via corresponding amplifiers providing a certain noise immunity by compensating for low signal strength and lossy channel media. Thus, advantageously each IN port has an amplifier (a receiver amplifier) by which it is connected to the appropriate outer contacts of each of the switching means, while each OUT port has another amplifier (a driver amplifier), by which it is connected to the centre contact of the associated switching means. The types of amplifiers needed for the various sorts of channel media are generally well known in the art, and need no further discussion. Nevertheless, when the channels are conductive wire pairs a typical device is that commercially available from Texas Instruments under the designation SN 75116, which includes both driver and receiver amplifiers. Moreover, just as the signals may need amplification, so, to deal with possible phase jitter, the input may need to be retimed. Accordingly, positioned inboard of each IN port (and specifically after any receiver amplifier) there is advantageously a signal regenerator which calculates the average bit rate of the incoming signal and generates a copy with all timing errors removed.

Not all the repeater units used in the invention need contain switch units of the type so far described, and it may indeed be advantageous to employ some repeater units the internal connections of which are fixed. For the most part, however, the repeater units used in the invention do incorporate switch units of the kind described, and preferably all these repeater units are the same, their switch units having four port pairs (even if not all are used to the full). In the following description the term "repeater unit" means, unless the contrary is stated, one containing the switch unit as described: it may, as appropriate, contain other components (such as driver/receiver amplifiers and signal regenerators).

Network Configuration

The repeater unit employed in the network of the invention enables the network to be configured as a ring, so that there is a circular communications link serially joining along the IN/OUT channels of all of the units connected one to another by the various communication paths between the port pairs of different units, and this ring—this circular link—is derivable regardless of the actual, physical, disposition of the units relative to each other. For example, in the very simple case where there are four repeater units so disposed that three (1, 2 and 3) are at the apices of a triangle, and the fourth (4) is adjacent the apex occupied by unit 3, and are connected by communication paths running along the sides of the triangle (1-2-3-1) and from unit 3 to unit 4, the circular link between all four could comprise, say, one side-one channel-of the path from 4 to 3, one side from 3 to 2, from 2 to 1 and from 1 to 3, at which point the link loops back via the other side of the path from 3 to 1, the other from 1 to 2, from 2 to 3 and from 3 to 4 . . . and thus back to where it started. Some simple examples similar to this are described hereinafter in connection with the accompanying Drawings.

Moreover, while the network may be configured by a method that causes there to be included only as many of the available links between repeater units as are actually necessary to set up the ring (so leaving some links completely unused), this is not preferred. Instead, it is very advantageous that all available links be incorporated within the ring even if their presence is not entirely necessary, for in this way all these links will be tested and therefore known to be operative and capable of use in the event of network failure elsewhere.

As will be appreciated, the situation with a mesh network of up to, say, fifty repeater units is somewhat more complex. The configuration—the "setting-up"—of such a network, however, is comparatively simple, and a suitable configuration method may be broadly defined as one in which, one particular station being arbitrarily designated the primary station, and being connected into the network by its own repeater unit, it causes that unit to poll the unit's port pairs in sequence—this may be in either direction along the notional port pair sequence, as explained below—to see whether each is connected by a communication path to another device (station or repeater unit), and if any such device replies then that device is connected into the network along that communication path and subsequently caused similarly to poll its own port pairs (if any) in sequence, this occurring before the preceding device polls its sequentially next port pair, and so on until all the repeater units and stations (and, of course, the communication paths therebetween) have been tested, found either acceptable, faulty or absent, and if the first linked into the network so as electrically to connect the devices and the communication paths therebetween into a closed ring.

Where a repeater unit has no mandatory port pair then the OUT port of any pair can be connected to the IN port of any pair and there is no preference for the direction in which the sequence of port pairs is polled. However, where a unit does have a mandatory port pair then it is possible for the OUT port of any pair to be connectable to the IN ports of only the port pairs sequentially nearer the mandatory pair. As a consequence, the polling of the port pairs during network configuration must be in a sequence the direction of which is of increasing unit port pair interconnection capability.

This method is applicable more generally than merely to the networks of the invention. Specifically, it is applicable to any network like that of the invention except that it has a minimum requirement that each of a number of selected units be connected in the defined manner by at least two, rather than three, paths to other units (in which case the minimum number of units in the network is two ratner than three).

At a more detailed level the inventive configuration method is slightly different depending whether the network is one wherein the repeater units have or do not have mandatory port pairs.

The method for configuring a network wherein the repeater units have no mandatory port pairs, and wherein one particular station is arbitrarily designated the primary station, and is connected into the network by a repeater unit correspondingly designated the primary repeater unit (all other stations, and all other repeater units, then being designated secondary), is one in which:

A (1) the primary station initiates operation of the network by transmitting to its repeater unit a "query-connect" signal, and awaits an acknowledgement, in the form of the same signal, from its repeater unit;

A (2) upon receipt of the acknowledgement the primary station then transmits to its repeater unit a start-up signal, and awaits an acknowledgement, in the form of the same signal, from its repeater unit; and A (3) when the primary station receives the latter acknowledgement the network is configured;

upon receipt by a repeater unit of a query-connect signal at the IN port of any port pair, either B (1) if the unit is neither receiving nor transmitting any other signals, then the unit transmits an acknowledgement, in the form of the same signal, to the OUT port of the same port pair, and awaits a "start-up" signal at the IN port, or B (2) if the unit is receiving or transmitting any other signals, then (i) if this query-connect signal has been received at the IN port of a port pair to the OUT port of which the unit is already transmitting the query-connect signal, then the unit connects the IN port of the sequentially last active port pair (an "active port pair" is a port pair at which the unit received the start-up signal and did not loop the pair back by connecting its IN port to its OUT port) to that OUT port, transmits instead the "start-up" signal to that OUT port, and awaits an acknowledgement, in the form of the same signal, at the IN port; or (ii) if the query-connect signal has been received at the IN port of a port pair to the OUT port of which the unit is not transmitting any signal then the unit connects this IN port to this OUT port, so looping back the pair, and marks the pair as used;

(C) upon receipt by a repeater unit of a start-up signal at the IN port of any non-looped-back port pair the unit either C (1) transmits a query-connect signal to the OUT port of the sequentially-next unused (non-looped-back) port pair, and awaits an acknowledgement, in the form of the same signal, at the IN port of that port pair, and
if within a predetermined time there is no such acknowledgement then the unit loops back the chosen port pair, transmits the query-connect signal to the OUT port of the following sequentially next used non-mandatory port pair, and awaits the acknowledgement at the IN port of that port pair, this stage being repeated until there is an acknowledgement, or C (2) if the sequentially-next non-looped-back port pair is that original port pair at the IN port of which the unit first received the start-up signal, connects the IN port of the last active port pair to the OUT port of that original port pair.

The method for configuring a network wherein the repeater units do have mandatory port pairs, and these are used to make connections to all the stations, and wherein one particular station is arbitrarily designated the primary station, and is connected into the network by a repeater unit correspondingly designated the primary repeater unit (all other stations, and all other repeater units, then being designated secondary), is one in which:

A (1) the primary station initiates operation of the network by transmitting on a control path to its repeater unit an "initialize" signal, causing the unit to begin a port pair polling process similar to that described above for a non-mandatory port pair repeater unit upon receipt of the start-up signal from its station (by transmitting a query-connect signal to the OUT port of the sequentially-first port pair, etc), and A (2) when the primary repeater unit receives the start-up signal at the IN port of the final sequentially-last active port pair (here an "active port pair" is a port pair at which the unit received the start-up signal and did not loop the pair back by connecting its IN port to its OUT port, or a pair which is the mandatory port pair), it connects that port to the OUT port of the mandatory port pair leading to the primary station, it connects the IN port of this mandatory port to the OUT port of the sequentially-first active port pair, and the network is configured;

(B) upon receipt by the repeater unit of a query-connect signal at the IN port of any non-mandatory port pair, B (1) if the unit is neither receiving nor transmitting any other signals, then the unit transmits an acknowledgement, in the form of the same signal, to the OUT port of the same port pair, and awaits a "start-up" signal at the IN port, else B (2) if the unit is receiving or transmitting any other signals, then (i) if this query-connect signal has been received at the IN port of a port pair to the OUT port of which the unit is already transmitting the query-connect signal then the unit connects the IN port of the sequentially last active port pair (at which it received the start-up signal and did not loop the pair back) to that OUT port (and where that IN port belongs to a mandatory port pair, connects the mandatory pair's OUT port to the IN port of the sequentially-previous active port pair), transmits instead the "start-up" signal to that OUT port, and awaits an acknowledgment in the form of the same signal, at the IN port; or (ii) if this query connect signal has been received at the IN port of a port pair to the OUT port of which the unit is not transmitting any signal then the unit connects this IN port to this OUT port, so looping back the pair, and marks the pair as used;

(C) upon receipt by a repeater unit of a start-up signal at the IN port of any non-looped looped-back, non-mandatory port pair the unit either C (1) transmits a query-connect signal to the OUT port of the sequentially-next non-looped-back non-mandatory port pair, and awaits an acknowledgement, in the form of the same signal, at the IN port of that port pair, and if within a predetermined time there is no such acknowledgment then the unit loops back the chosen port pair, transmits the query-connect signal to the OUT port of the following sequentially-next unused non-mandatory port pair, and awaits the acknowledgement at the IN port of that port pair, this stage being repeated until there is an acknowledgement; or C (2) if the sequentially-next non-looped-back non-mandatory port pair is that original port pair at the IN port of which the unit first received the start-up signal, connects the IN port of the sequentially-last active port pair to the OUT port of the original port pair via the OUT and IN port of any intervening mandatory port pair.

Where a network includes both repeater units with mandatory port pairs and repeater units without mandatory port pairs, then naturally the configuration method will be a logical blend of the mandatory and non-mandatory procedures. As can readily be appreciated, in general the two procedures will only differ significantly if the primary station happens to be connected to the repeater unit via a mandatory rather than non-mandatory port pair.

As suggested hereinabove, it may be desirable to preset the internal connections of any repeater unit in order to force a particular configuration upon the network. This capability could be useful in testing the system, or if it was advantageous to divide the network into a number of smaller, autonomous rings connected by single well defined links. One convenient way of achieving preset configuration is first freely to configure the network, then for one station to issue the presetting information to the relevant other stations, to be acted upon when next the network is configured (so that those stations' repeater units suitably interconnect their port pairs), and thirdly for the one station then deliberately to close down the network so that upon reconfiguration it has the desired, preset, configuration.

Each time configuration (or reconfiguration) of any network is necessary one station is arbitrarily selected, as the primary station, to take on the responsibility of initiating configuration. However, all stations are preferably capable of initiating configuration (and reconfiguration), and therefore in order to prevent all trying at once it is arranged that upon switching on the network, or upon the discovery during operation of an error state necessitating reconfiguration, each station be programmed to attempt configuration initiation after a time the length of which depends upon the station. If all these time lengths (the "time-out" periods) are sufficiently different, then it will always be the remaining station with the shortest time out period that initiates configuration. The shortest time out period can, of course, be allotted to any station.

It may be the case that during operation a network component—a station, a repeater unit or a link—fails, and the ring is broken. As stated earlier, it is conceivable that the repeater unit noting that it is no longer receiving a signal at the IN port of a port pair to the OUT port of which it is sending a signal could take action by re-routing its output past the "failed" port pair to the sequentially next port pair. And—though differences in device sensitivity may modify this—the repeater unit likely to notice the failure first is that unit next to the failure, so little of the network need be cut off by this re-routing. However, in most cases there will be another configuration of the network enabling the failure to be by-passed so that no parts of the network are cut off, and indeed this capability of by-passing failures is the main advantage of this network over the state of the Art. Therefore it is preferable not to reconfigure partially, cutting off part of the network, but instead to reconfigure the whole network ab initio (such reconfiguration should be reported to a system management entity to ensure that the failure is repaired) Reconfiguration is done in exactly the same way as configuration, save that it is initiated automatically when each repeater unit, one by one, senses a loss in returned signal and goes into a pending state (in which no signals are transmitted on any path) for a sufficient time that when it leaves this state to begin reconfiguration all the repeater units have similarly entered the pending state. When each unit leaves the pending state it signals its associated station (if there is one) to begin its time-out period, and the first station to end its time-out period initiates configuration.

BRIEF DESCRIPTION OF THE DRAWINGS

Various examples of Prior Art, and embodiments of the invention, are now described, though by way of illustration only, with reference to the accompanying Drawings in which.

DETAILED DESCRIPTION

Figure 1A:
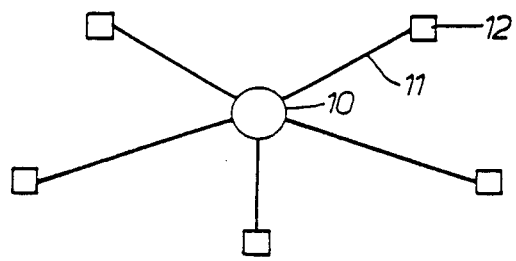
FIG. 1A, B and C show the three main types of network topology.

The inventive networks shown in the drawings employ for the most part switch units each having a mandatory port pair. Purely for convenience the units are depicted with their port pairs' sequence in an anti-clockwise direction, so the network configuration is effected in a clockwise direction.

The earliest of networks used the star topology, the essential components of which are shown in FIG. 1A. In a star network a central switch (10) is connected by communication paths (as 11) to a number of outlying stations (as 12). If the central switch 10 fails the whole network fails, though if any one path 11, or one station 12, fails then only that limb of the the network is lost.

Figure 1B:
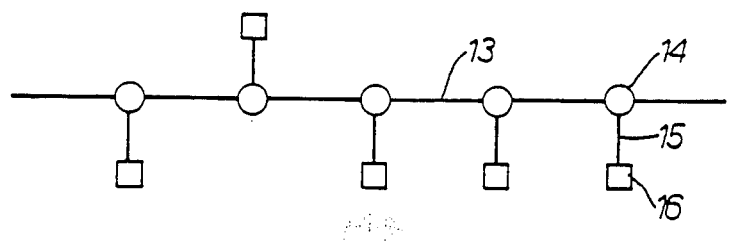

FIG. 1B shows the components of the presently popular bus topology. The bus is a linear communication path (13) to which are attached at various points (as 14) along it a number of side branches (as 15) to outlying stations (as 16). There is no complex central switch (10 in FIG. 1A), but a break in the bus 13 could cause the loss of several stations 16.

Figure 1C:
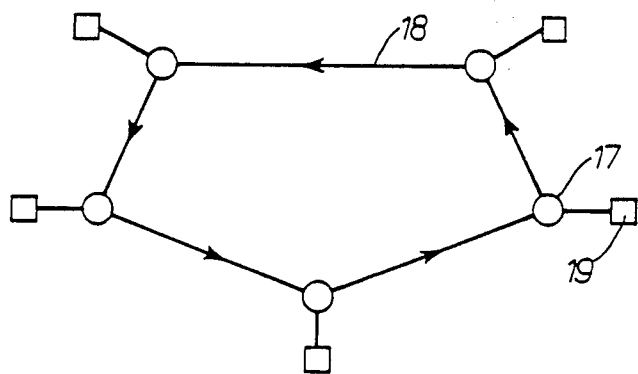

In FIG. 1C there is shown a network with a ring topology. The ring consists of a sequence of repeaters (as 17) linked by the ring path (as 18), and to each repeater there is attached a station (as 19). Data is passed round the ring, from repeater to repeater, in one direction only. If a repeater 17 or a ring link 18 fails then the whole network fails.

Ring networks have considerable advantages, but their total failure if a link or repeater fails is extremely disadvantageous. Various modified rings have been designed to deal with this problem.

Figure 2A:
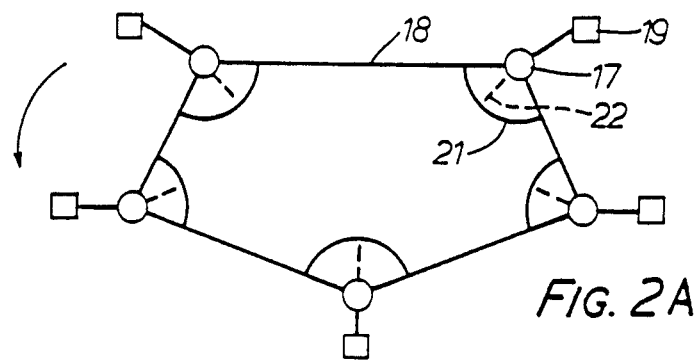
FIGS. 2A, B, C and D show four types of "advanced" ring networks.

The ring of FIG. 2A is the bypass ring. Each repeater contains an internal bypass (21) held open by a relay (not shown, but symbolized by the dashed line as 22) that is powered only so long as the repeater itself is operating properly. If the repeater fails then the relay opens, the bypass is closed, and all data to that repeater is routed past it to the next along the bypass. This system does not allow for link failure.

Figure 2B:
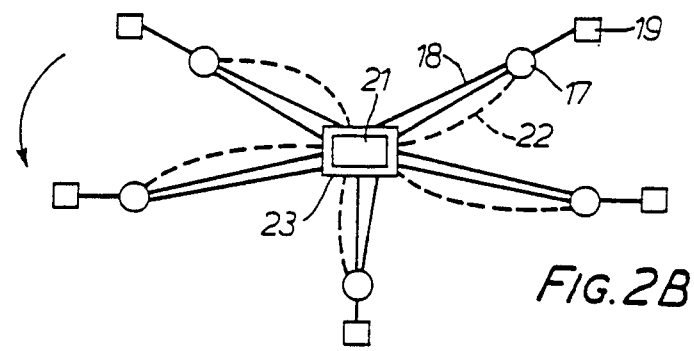
Figure 2C:
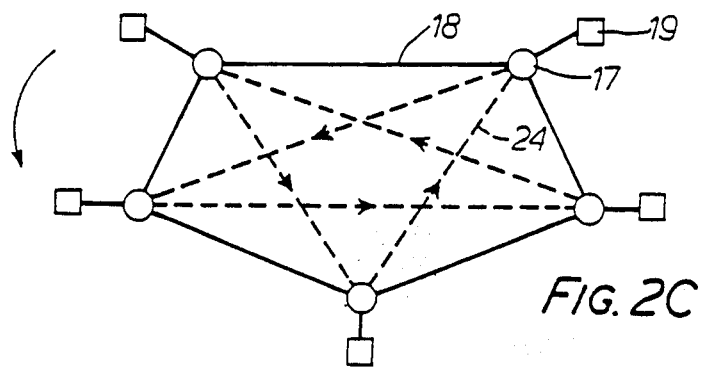

One modification of the bypass ring is the star ring, of FIG. 2B, in which all the bypass links and their relays are gathered into a single, central, unit (23). This variation can cope with link failure, for either link or repeater failure inactivates the relay and so brings in the bypass. Another modification is the braided ring of FIG. 2C, in which every repeater 17 is connected to the next-but-one repeater by a spare link (as 24) which the two repeaters at its ends can bring into the ring if the intervening repeater (or its links) fail.

Figure 2D:
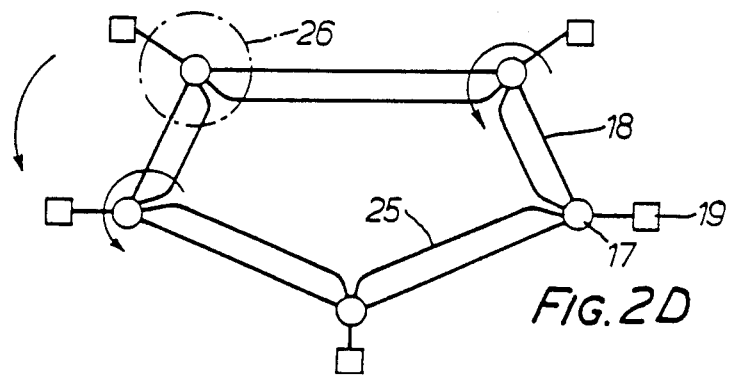

An alternative bypass modification is that of FIG. 2D, which shows a double ring. Here selected (shown as each) repeaters are connected with each other by links (as 25) forming a subsidiary ring that is normally not used. If a failure (at 26, say) occurs in the main ring then the last working repeater uses the subsidiary ring to send the data back around the circuit (in the opposite direction) to the first working repeater on the other side of the failure, whereupon the main ring is then used. Once the first failure has occured, and the subsidiary ring been put in use, the system is now a simple ring (in "squashed" form), and can absorb no further failures.

FIGS. 3 to 10 relate to networks according to the invention. In all the FIGS. 3 there are shown five stations (as S) each linked to its own repeater unit (as R), the repeaters being themselves interconnected and linked one with another, in accordance with the invention, in different ways (in FIG. 3C there is included a sixth repeater unit to which no station is connected). In each case the ring has been configured according to the preferred method described hereinafter, using the algorithm "take the next path on the left", with configuration being initiated from the station marked S.

Figure 3A:
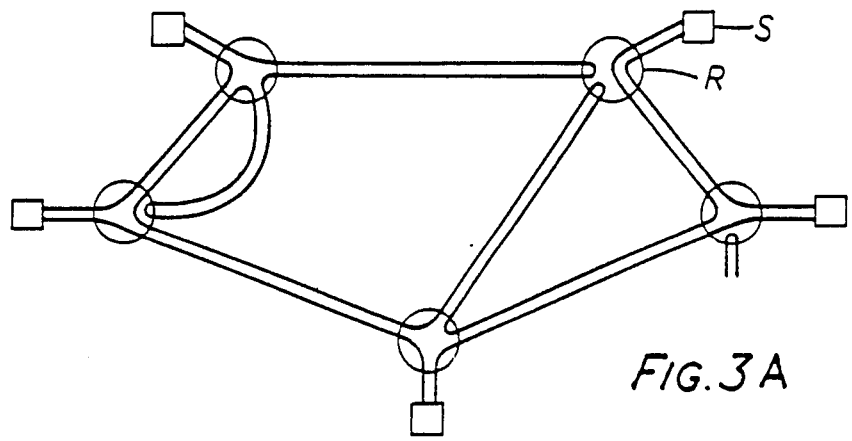
FIGS. 3A, B and C show various states of a simple inventive ring network having a physical disposition much like that of the ring networks of FIG. 2.
Figure 3B:
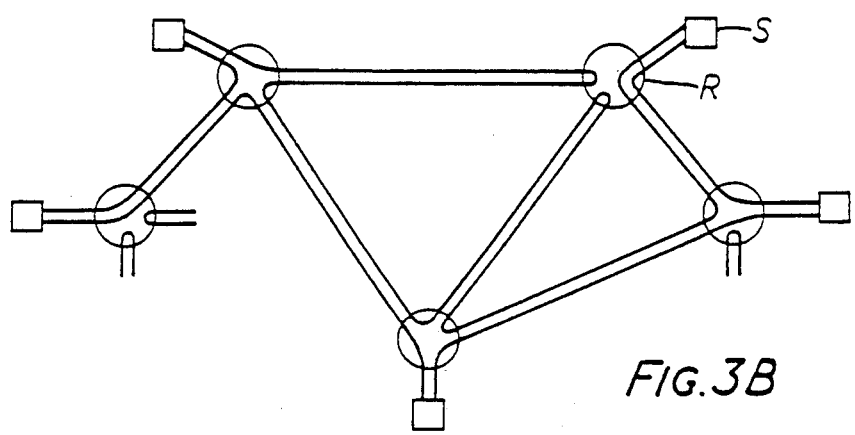
Figure 3C:
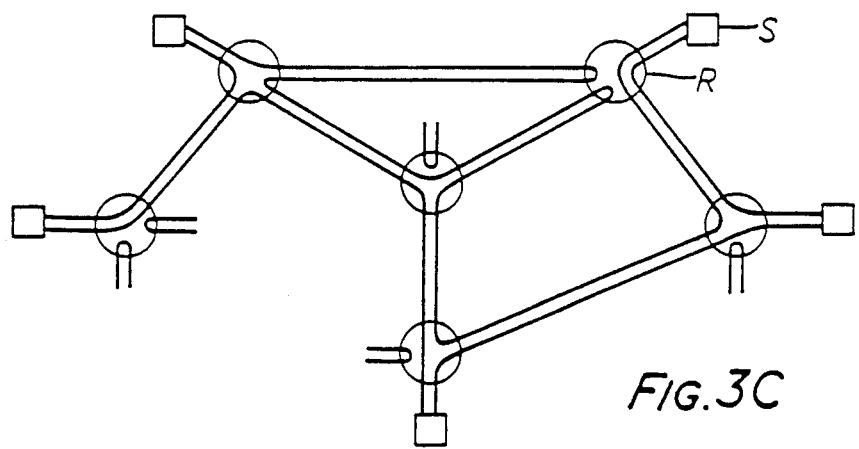
Figure 4A:
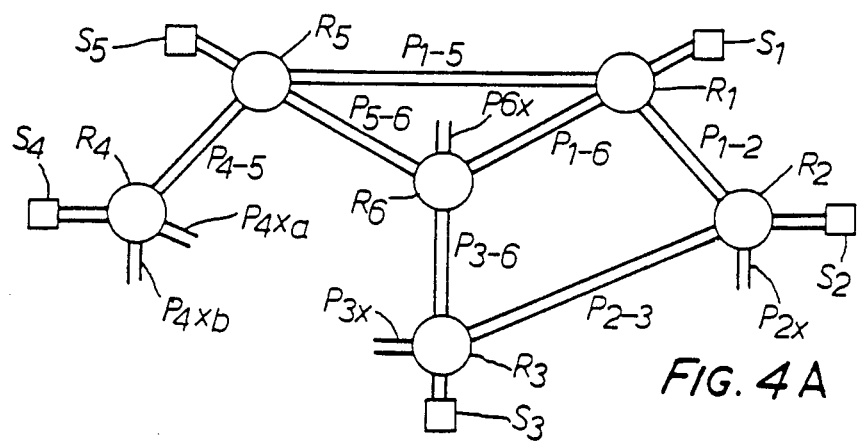
FIGS. 4A to 4G show details of a different simple network similar to that of FIG. 3C.

FIG. 4A shows the basic physical outline of a network similar in general disposition to that of FIG. 3C. The network has five stations (S1-S5) each with its own repeater (R1-R5), and the extra repeater (R6), and various pathways (as P1-5, and P2-3) between certain of the repeaters. Each of the repeaters is a four port repeater (here, "port" is used to mean "port pair"), but in repeaters R2, R3, and R6 one port is not connected, while in repeater R4 two ports are not connected.

In order to keep the Figures clear, only some of the relevant reference numerals have been used in related FIGS. 4B to 4G.

Figure 4B:
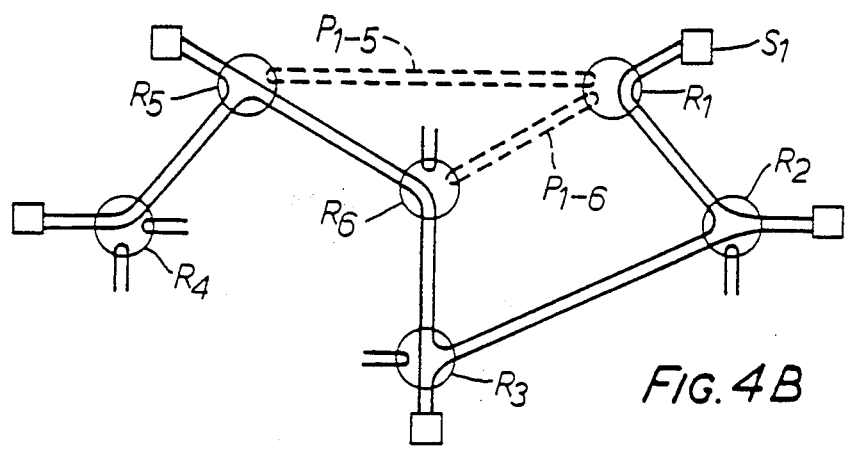

The ring of FIG. 4B has been configured using a method other than the preferred method described hereinbefore (this preferred method has been used for the ring of FIG. 4C), and each repeater is joined—by the ring—once only. Starting with station S1 the ring is as follows: S1 - R1 - R2 - S2 - R2 - R3 - S3 - R3 - R6 - R5 - R4 - S4 - R4 - R5 - S5 - R5 - R6 - R3 - R2 - R1 - S1. Paths P1-5 and P1-6 are not used at all.

This ring is acceptable, but because certain paths are not used they may fail without the system noticing—and if they are then needed (because of a main path failure, say), they will prove valueless.

Figure 4C:
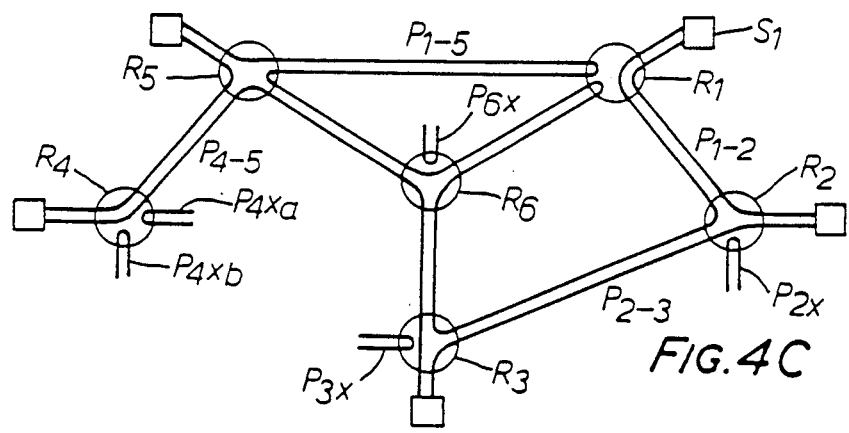

The ring of FIG. 4C (which is identical in physical layout to that of FIG. 3C) solves this problem. It is set up by the preferred method described hereinbefore in which each repeater is polled in turn along every possible path (the algorithm here was "take the next path on the left"), and all paths are then incorporated into the ring. The order of components is now as follows:
S1 - R1 - R2 - S2 - R2 - R3 - S3 - R3 - R6 - R5 - R4 - S4 - R4 - R5 - S5 - R5 - R1 - R5 - R6 - R1 - R6 - R3 - R2 - R1 - S1
and this achieved (on the assumption that none of the repeater units contains a mandatory port) by a configuration process that is, in part, as follows:

(1) S1 is arbitrarily chosen to initiate configuration, and sends the query-connect signal to its repeater R1, and awaits its return.

(2) R1 returns the query-connect signal to S1.

(3) sends R1 the start-up signal, and waits for it to be returned.

(4,5) R1 now sends the query-connect signal to R2, which returns the signal.

(6) R1 then sends the start-up signal to R2, and waits for it to be returned.

(7,8,9,10) R2 now polls S2 by sending it the query-connect signal, and, when S2 returns it, follows this with the start-up signal, which S2 immediately returns.

(11) R2 then sends the query-connect signal to the OUT port of the unused path P2X, and, failing to receive it back within the pre-determined time, loops this port pair back.

(12 ... ) R2 then polls R3.
R3 polls S3.
R3 now polls on unused path P3X, and loops this port pair back when no reply is received.
R3 then polls R6.
R6 polls R5.
R5 polls R4.
R4 polls first on unused path P4Xa, then unused path P4Xb (looping back both), and finally succeeds on polling S4. It then connects the IN port of the port pair associated with path P4-5 to the OUT port of the port pair associated with S4, and the IN port of the latter port pair to the OUT port of the port pair asociated with R5 (leading to path P4-5), and in this way the start-up signal is returned to R5.
R5 polls S5.
R5 then polls R1 which immediately loops back the relevant port pair.
R5 now returns the start-up signal to R6.

R6 now "polls" on path P6X, loops this path back and polls R1.
R1 loops the path back.
R6 now returns the start-up signal to R3, R3 then returns the signal to R2, and R2 returns it to R1.
Finally, R1 ignores both looped back paths P1-5 and P1-6, and returns the start-up signal to S1.
And the configuration is complete.

If, however, each station was connected to its repeater unit by a mandatory port pair (R6 has no mandatory port pair), then the configuration procedure, while very similar, would nevertheless be different, and as follows:

(1) S1 is arbitrarily chosen to initiate configuration, and "initializes" its repeater R1.

(2) Not applicable (3) Not applicable (4,5) R1 sends the query-connect signal to R2, which returns the signal.

(6) R1 then sends its internally-generated start-up signal to R2, and awaits its return.

(7,8,9,10) Not applicable

(11) R2 then polls R3, and upon receipt of the query-connect signal back then links the mandatory port to S2 into the ring (with its bypass operative) by connecting the IN path of the R2 port pair associated with path P1-2 to the OUT port of the mandatory port pair, and the IN port of this latter port pair to the OUT port of the port pair associated with path P2-3; the received start-up signal is sent on to R3.

R3 first polls unused path P3X, looping it back.
R3 then polls R6, and connects in the S3 mandatory port (with bypass).
R6 polls R5.
R5 polls R4.
R4 polls unused paths P4Xa and P4xb, looping both back, and then immediately connects in the S4 mandatory port (with bypass).
R5 then polls R1 (which loops back P1-5), and connects in the S5 mandatory port with bypass).
R5 now returns the start-up signal to R6.
R6 polls unused path P6X, and loops it back.
R6 then polls R1 (which loops back P1-6).
R6 returns tne start-up signal to R3, R3 returns the signal to R2, and R2 returns it to R1.
R1 ignores both looped-back paths P1-5 and P1-6, and finalises the configuration by connecting in S1.

As so far described each mandatory port (pair) has its bypass in operation. During the configuration, however, each station quite independently receives the start-up signal from its repeater unit's internal generator, and attempts to "synchronize" with this signal. In practice, once synchronization is achieved (which may occur at any time during or after configuration, depending upon the length of time needed for each) the station deactivates the bypass, and thus links itself into the network (without the rest of the network perceiving any difference).

Figure 4D:
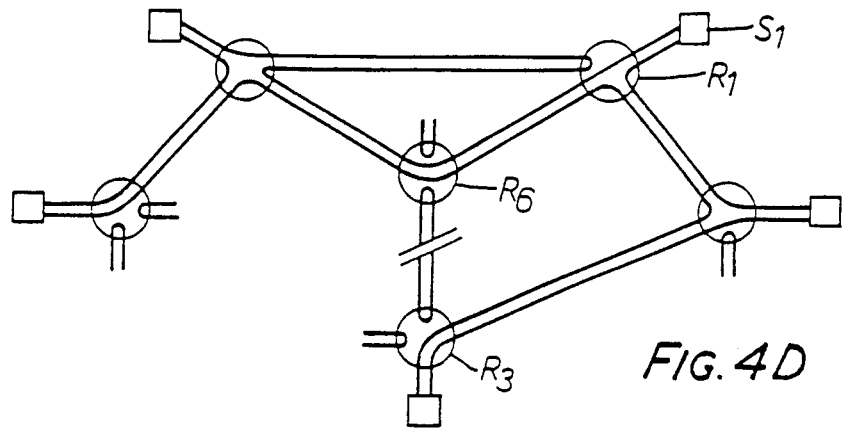
Figure 4E:
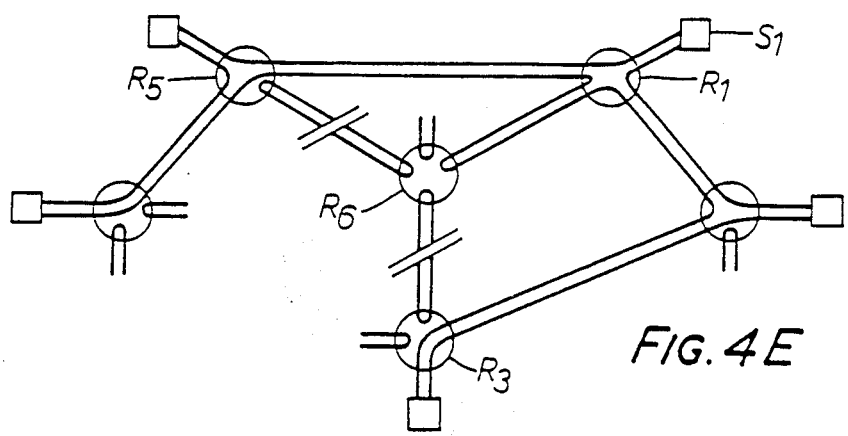
Figure 4F:
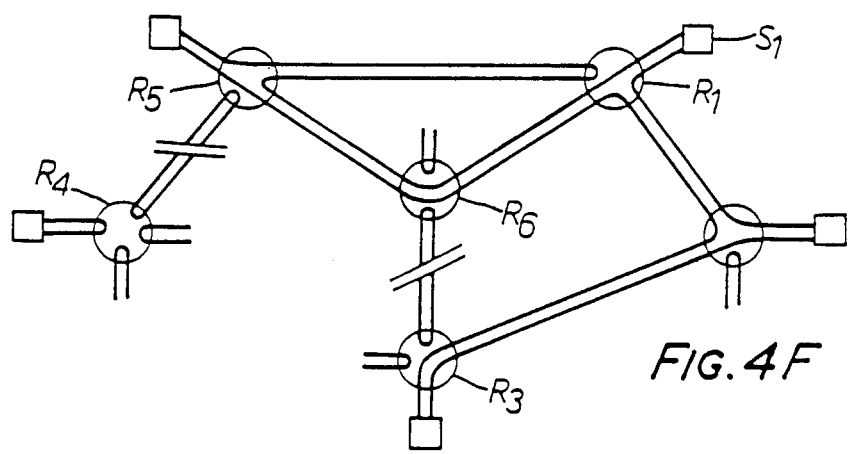

In FIG. 4D there is shown the same network but re-configured after a fault in the link from R3 to R6, while FIGS. 4E and 4F show the network again re-configured after additional failure either in the link between R5 and R6 or in the link between R4 and R5. In the latter case R4 and S4 have been isolated by the link failures, but until then the network had been able to absorb the failures without any apparent effect. The configuration procedure adopted in these cases is very similar in general concept to the procedure now described with reference to FIG. 4G.

Figure 4G:
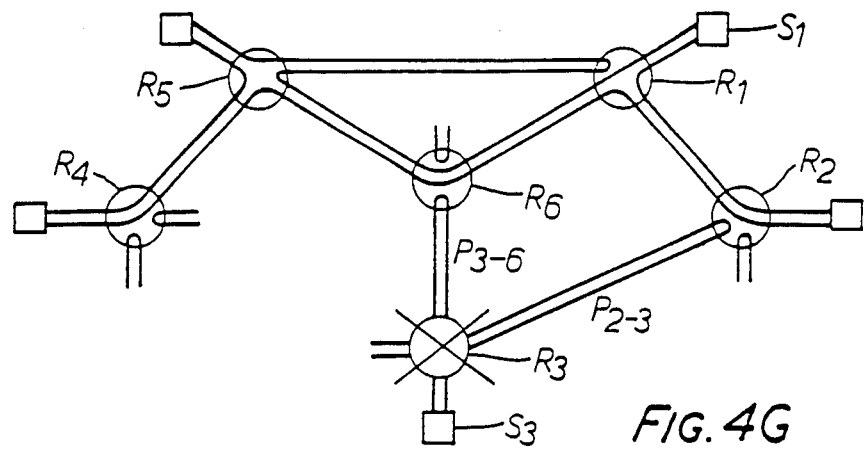

FIG. 4G shows a network like that of FIG. 4C but assuming that repeater R3 has failed. All the other repeaters and stations are connected, leaving S3 isolated.

The reconfiguration procedure is as follows:

(1) R2 and R6 will be the first repeaters to notice the loss of signal from R3 (this signal should be at R2's IN port associated with path P2-3 and at R6's IN port associated with path P3-6). Each will immediately go into its pending state.

(2) R1 and R5 now notice that R2 and R6 have stopped sending, and each goes into its pending state, and R4 follows on noticing that R5 has stopped sending.

(3) After a predetermined time each repeater leaves the pending state and signals its station (if there is one) to start its time-out period.

(4) The first station to end its time-out period (here assumed to be S1) then initiates reconfiguration.

(5) Reconfiguration proceeds in the same way as the original configuration, except that no query-connect signal is received back from R3, so that at R2 and R6 the paths leading to R3 are looped back.

In a practical situation this re-configuration (and the failure causing it) would be reported to the system management, and after the failed repeater R3 has been repaired or replaced the network may be re-configured again to include R3/S3, this reconfiguration being initiated by any station or repeater chosen arbitrarily from those in the network.

Figure 5:
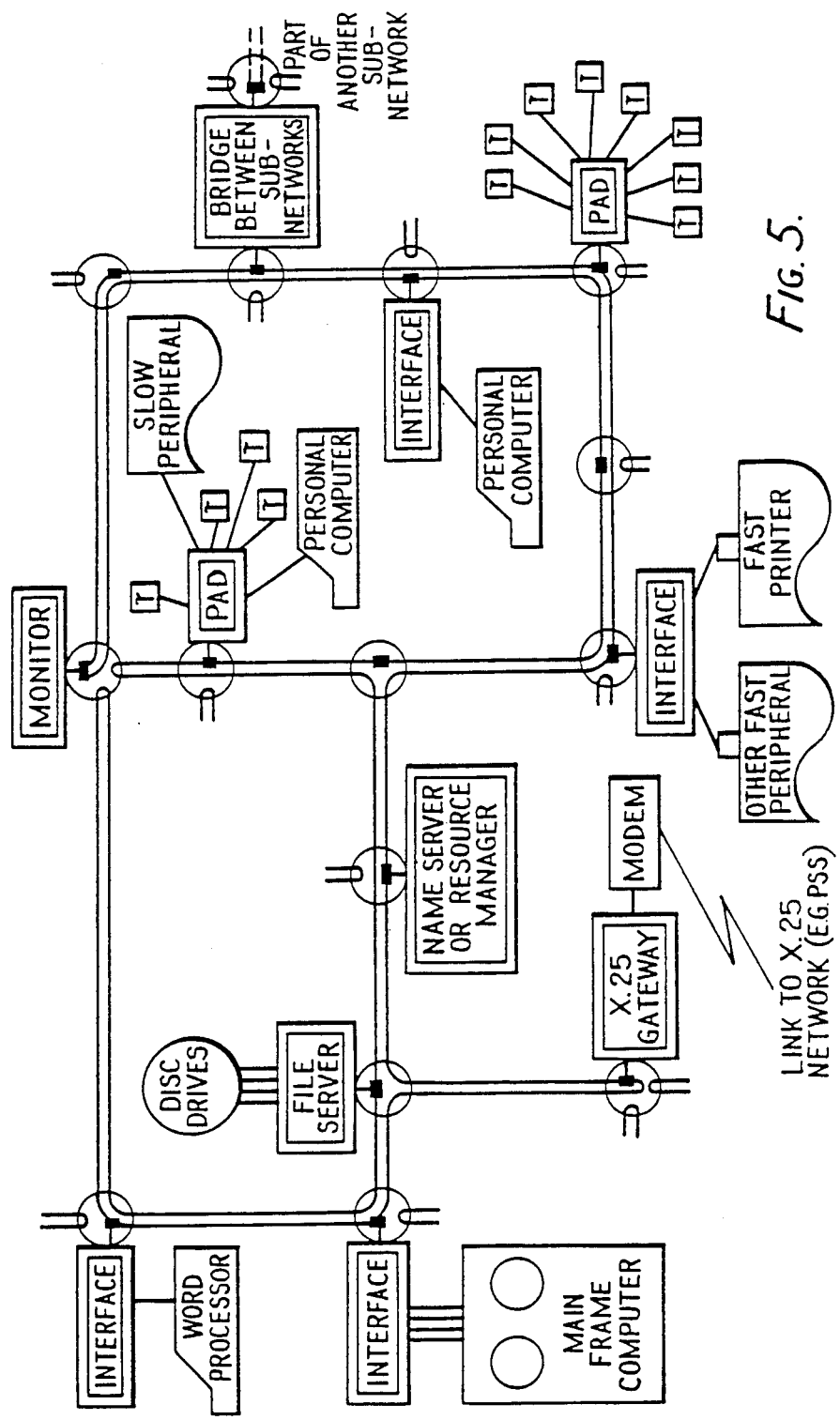
FIG. 5 shows in full a small local area network in accordance with the invention.

FIG. 5 shows a complete small local area network according to the invention. In this Figure each station is named as either a device or an interface to a device, and to reduce confusion the path between each station and its repeater/switch unit is shown as a single link to a "junction" box. The network has been configured in the preferred manner (turn to the left, and include all available paths). Apart from these points the Figure speaks for itself—and it is necessary only to observe that in this particular case the primary station has been named the "monitor", and that in normal use the network operates independently of the monitor (which is employed merely to collect statistics about network operation).

Figure 6C:
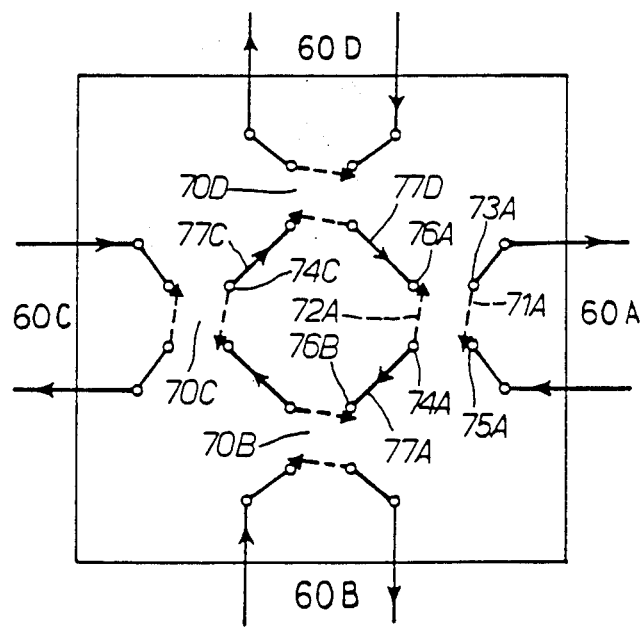
FIGS. 6A, B and C show details of three inventive switch units (respectively a wiper-blade type, without and with mandatory port pairs, and a cross-over type)
Figure 6A:
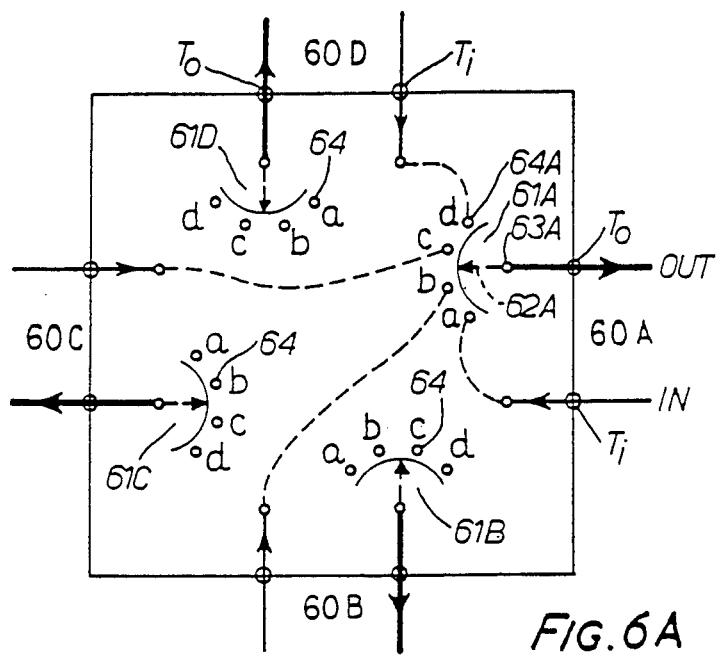
Figure 6B:
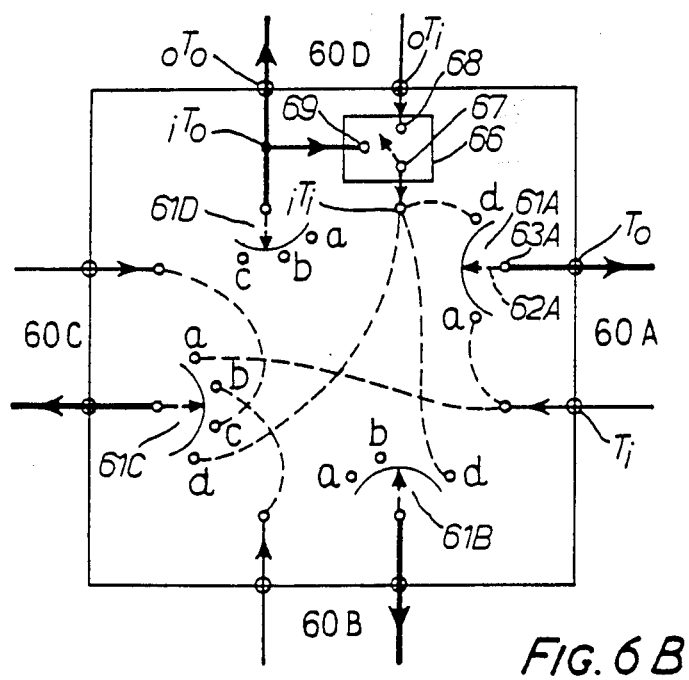

In FIGS. 6A and B there are shown diagrammatically two four port pair switch units of the invention. That of FIG. 6A is the simpler form, wherein there are no mandatory ports and therefore only one switching means per port pair, while that of FIG. 6B is the core preferred form, wherein there is one mandatory port pair which has two switching means, the second being the bypass switch and thus being positioned so as to enable the internal side of the IN port of the mandatory port pair to be connected to the OUT port of that pair rather than to the external side of the IN port (and thence to the incoming communication channel). The bypass switch allows the signal route which would normally pass via the station to be made instead via the bypass, so that existing internal switch arrangements are independent of the station's presence or absence.

The switch unit of FIG. 6A is a device with four port pairs (60,A,B,C and D each represented by a pair of single terminals as $T_i$ and $T_o$), each of which has an IN port and an OUT port, arranged clockwise around the unit. The unit includes four switching means (61,A,B,C and D) each of which is shown as a four-way switch having a centre wiper (as 62A) connected to a centre contact (as 63A) and movable into engagement with any one of four outer contacts (as 64A) one of which is the a port simply by virtue of its permanent wired connection to the relevant IN port of port pair 60A, another of which is the b port because of its connection to the 60B port pair IN port, and so on. Some of these connections are indicated by dashed lines; for clarity, however, most are not shown. The centre contact (as 63A) of each switching means is connected to the OUT port of the associated port pair. By engaging wiper 62A with the b contact 64Ab the IN port of port pair 60B is connected to the OUT port of port pair 60A. By appropriately setting the wipers the OUT port of any port pair may be connected to the IN port of any port pair.

The more preferred form of switch unit shown in FIG. 6B is much the same as that of FIG. 6A save for the additional switching means (66) associated with the IN port of mandatory port pair 60D. In this case the port is represented not by a single terminal (as $T_i$ in FIG. 6A) but by a pair of terminals—an outer terminal ($_oT_i$) and an inner terminal ($_iT_i$)—which are electrically connected by a switched link. The bypass switching means 66 both bridges the IN and OUT ports and simultaneously disconnects the link between the inner and outer side of the IN port. The bypass switching means has its centre contact 67 connected to all the d contacts of the switching means at port pairs 60A, B, C and its two other contacts (68, 69) connected respectively to the IN port and to the OUT port of the mandatory port pair.

Using the bypass switching means, signals can either be routed to the station or past the station.

Unlike the FIG. 6A unit (in which any OUT port can be connected to any IN port), the FIG. 6B unit is one in which there is a mandatory port pair 60D and the other port pairs have only the minimum interconnectability. Thus, the 60C port switch unit has contacts a, b, c, and d, the 60B unit contacts a, b, and d, and the 60A unit only contacts a and d.

An alternative internal disposition of the switch unit is shown in FIG. 6C. This disposition allows the unit to be set into any connection arrangement used in the preferred configuration method. In the form shown there is no mandatory port pair. The arrangement of the port pairs is the same as in the unit of FIG. 6A. There are four cross-over switching means (70A,B,C and D) each of which is shown as a cross-over switch with two wipers (as 71A, 72A) connected to OUT contacts (as 73A,74A) and each movable into engagement with either of the two IN contacts (as 75A,76A), except that only one of the two wipers may be in engagement with each IN contact at a time. At each switching means one IN contact is connected to the IN port of the associated port pair, and one OUT contact is connected to the OUT port of the same port pair. The remaining IN and OUT contacts of the various switching means are internally connected in a loop around the unit such that the second out contact of each switching means (as 74A) is connected (as 77A) to the second IN contact of the sequentially-next switching means around the unit (as 76B).

The more preferred form of the switch unit with this internal disposition with a mandatory port pair is much the same as that of FIG. 6C except that the switching means 70D is replaced by a bypass switching means as shown (66) in FIG. 6B. In this form connections are made between the centre contact 67 and the IN contact 76A, and between the OUT contact 74C and the OUT port of port pair 60D, replacing the connections 77D and 77C in FIG. 6C.

In addition, for every form of the switch unit, it is preferred to have additional switching means or contacts allowing OUT ports to be connected instead to one or more internal signal generators, and to have signal detect means associated with IN ports.

Figure 7A:
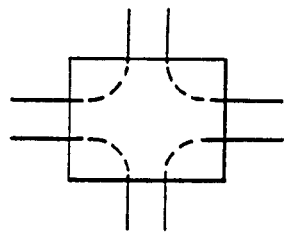
FIGS. 7A, B, C, D, E and F show the various internal connection arrangements possible with a switch unit like that of FIG. 6A.
Figure 7B:
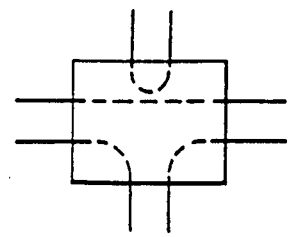
Figure 7C:
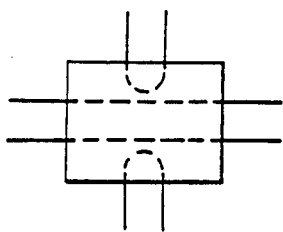
Figure 7D:
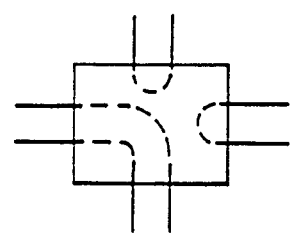
Figure 7E:
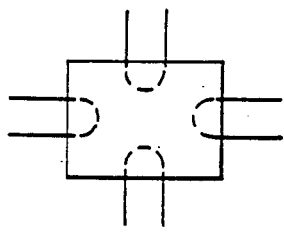
Figure 7F:
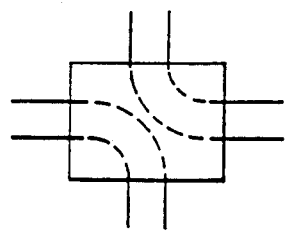

The six possible connection arrangements with a four port pair switch unit like that of FIG. 6A (without any mandatory port pair) are shown in FIGS. 7A, B, C, D, E and F. They need no further comment here, except to note that the arrangement of Figure F is not available using the preferred configuration method described herein (though by forcing two adjacent port pairs to connect up the method would provide this result).

Figure 8:
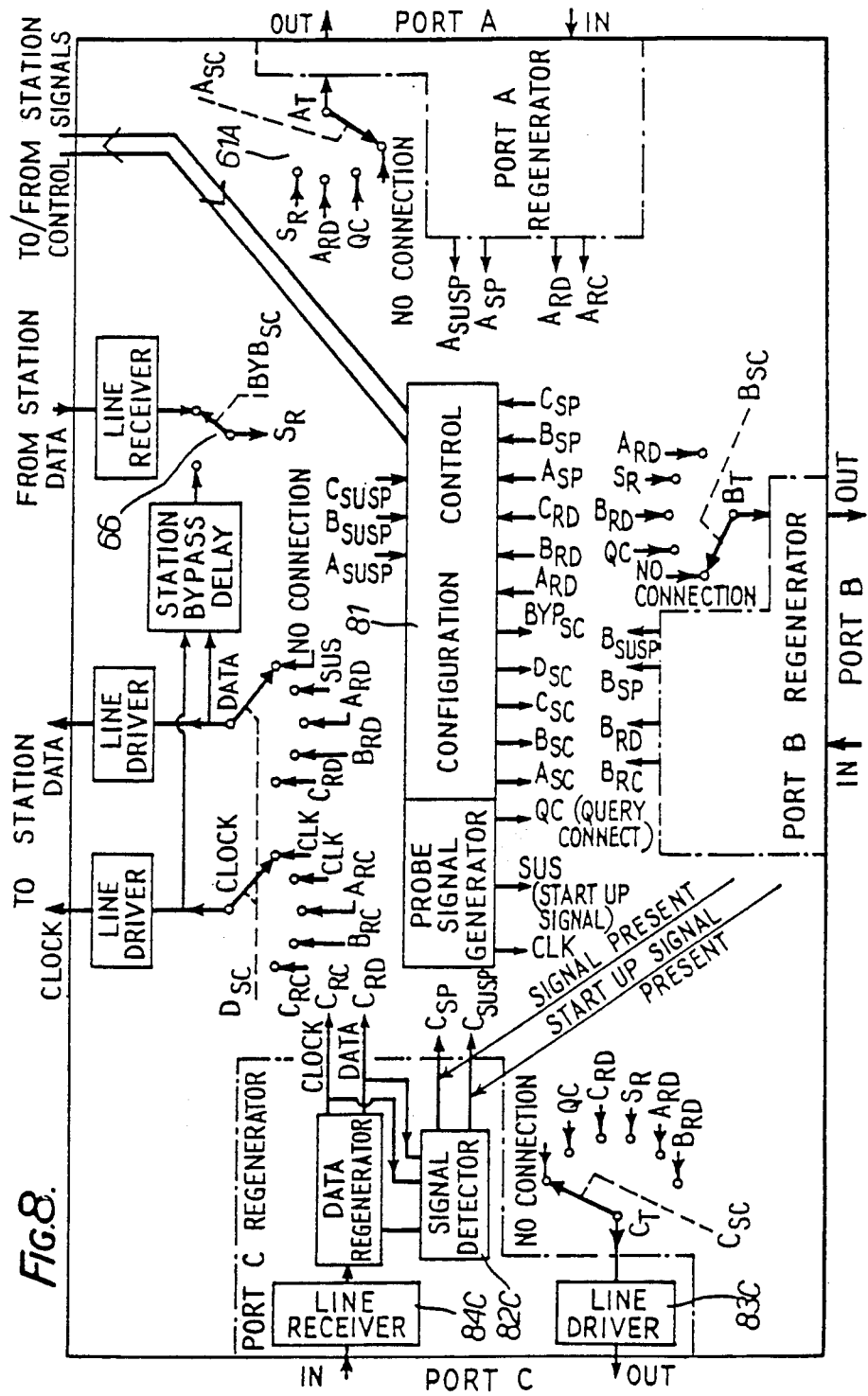
FIG. 8 shows further details of a switch unit of the type shown in FIG. 6B.

More details of a preferred form of four port pair switch unit (repeater) are shown in FIG. 8. The unit is like that of FIG. 6B, save that it includes a single configuration control means (81) operating the switching means (as 61A, and 66), signal detect means (as 82C) associated with the IN ports of each of the non-mandatory port pairs, and the line drivers and receivers (83C and 84C).

The switching means have been shown so far as wiper switches, but in reality they will in an electrical implementation be semiconductor devices.

Figure 9:
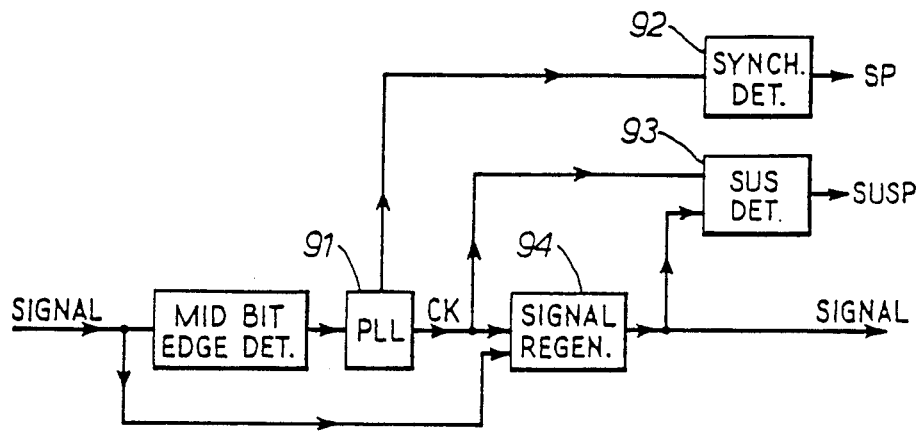
FIG. 9 is a block diagram of a signal detect means for use in the switch unit of FIG. 8.

A form of signal detect means is shown in FIG. 9, together with the relevant portions of the signal regenerator system. It comprises a phase-locked-loop clock recovery sub-system (91; a conventional combination of phase comparator, operational amplifier, low pass filter and voltage-controlled oscillator) to which is fed a string of pulses derived from the amplified IN port signal, a synchronization detector (92) indicating whether the phase-locked-loop is in lock or not and hence whether a signal is being received or not, and the start-up signal detector sub-system (93) which takes the IN port signal via the regenerator bistable (94). The start-up signal detector sub-system 93 comprises (not shown separately) a shift register into which the regenerated data signal is clocked, and a comparator. The comparator holds a master representation of the start-up signal; this is compared with the shift register contents, and the result indicates whether the data signal received is the start-up signal or not.

Figure 10:
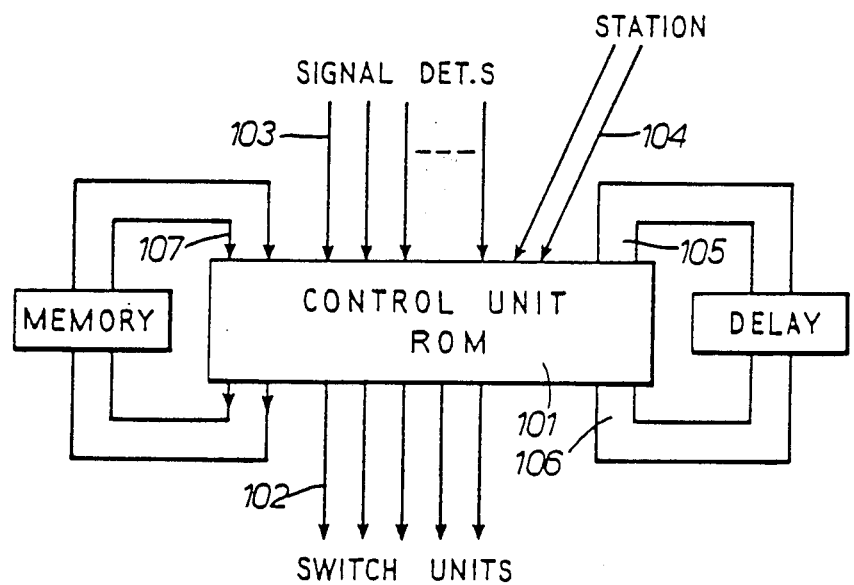
FIG. 10 is a block diagram of a control means for use in the switch unit of FIG. 8.

Each switch unit includes control means for determining the internal interconnections between the unit's ports and also—in the preferred case—between any port and the generators that provide the query-connect and start-up signals. A simple block diagram for one embodiment of control means is shown in FIG. 10.

The central component of the unit is a Read-Only-Memory (ROM 101) in which is stored a collection of predetermined combinations of switching means settings. When selected, each combination is output via the control lines (102) to the switching means (not shown in the Figure), and causes each of these latter to make the required connection between its centre contact and the appropriate one of its outer contacts. The particular combination of settings selected is determined both by inputs to the ROM from various other devices within the switch unit and by part of the output of the ROM itself (so that a type of feedback loop is set up). The inputs from the other devices are those from all the signal detect means, from the station associated with the switch unit, and from time delay means. The signal detect means input (103), of which there is a pair for each non-mandatory port pair, indicates that there is a signal or that there isn't, and in the former case that the signal is either the start-up signal or it isn't. During operation of the network it is the signal/no signal input which is crucial, whereas during the configuration procedure there is also taken into account whether the signal is the start-up signal or not (in which case it is the query-connect signal). The station control input (104) indicates either that configuration is to be initiated or that upon reconfiguration certain internal connections will be made in certain pre-determined ways (specifically, that certain port pairs will be looped back), or both of these. The time delay input (105) determines how long the control means should wait in any particular state (corresponding to a particular combination of switching means settings) before progressing to whatever next state is appropriate. This time delay is itself set by an output (106) of the ROM, so forming a second feedback loop. The input (107) to the ROM from the ROM itself (the first feedback loop mentioned above) is a record of the immediately previous output (the combination of switching means settings last applied). The present output is thus determined historically—by what has gone before—as well as by the present inputs from the other devices, and so the combination of switching means settings to be chosen next can be different, even with the same inputs from other devices, if it has been arrived at along a difference sequence of switching means settings. In FIG. 4C, D and E, for example, repeater unit R1 is during network operation receiving non-start-up signals at each of its non-mandatory port pairs, and therefore the signal detect means outputs will be the same in each case. Nevertheless the repeater units are configured differently, requiring different ROM outputs: this is because the historical order in which the port pairs were polled during configuration was different in each case—and this order manifested itself in the feed-back ROM output, which caused different subsequent outputs (switching means settings) to be selected.

The collection of switching means settings may be regarded as a number of branching sequences of settings, for in every case the next setting to be selected—the decision as to which branch to take—will automatically follow from the present setting, the way in which it was achieved, and the inputs received as a result thereof.

We claim:
1. A communications network which includes a multiplicity of interconnected switch units, wherein:
each switch unit has a plurality of communication port pairs each comprising an OUT and an IN port, each of at least one unit having at least three such pairs;
via their respective port pairs, each switch unit is connected to at least one other switch unit by a communication path, there being at least one path to each such other unit, each path comprising an OUT and an IN channel, each of at least one unit being so connected by at least three paths to other units; and
for each switch unit its OUT and IN ports are internally interconnectable such that
if there is not port pair that must be involved in this interconnection, and is thus a mandatory pair, then the OUT port of any pair can be connected to the IN port of any pair,
while if there is such a mandatory port pair then the unit's port pairs are in a notional sequence with the mandatory pair at one end, and the OUT port of any non-mandatory pair can at least be connectd either to the IN port of that pair or to the IN port of any of the port pairs sequentially nearer the mandatory pair, and the OUT port of the mandatory port pair can be connected to the IN port of any non-mandatory pair;

whereby with the provisos above, the switch units are capable of being interconnectd via their non-mandatory port pairs one with another in an entirely arbitrary arrangement, and regardless of the actual physical-disposition interconnection arrangement of the units relative one to another the network may be configured as a ring by suitably internally interconnecting each such unit's communication port pairs so as to form a circuclar communications link serially joining all of the units in the network; and wherein in operation both channels of each of the communication paths that are used in the configured network carry signals.

2. A network as claimed in any of the preceding claims, wherein each switch unit has four port pairs, enabling it (for example) to be connected simultaneously to three other units and an interface station.

3. A network as claimed in claim 1, wherein, each switch unit being connected by at least one communication pathway to each of at least one other switch unit, and some selected switch units being so connected by at least three paths to other units, the paths from any one of the selected units join that unit to as many other units as there are paths.

4. A network as claimed in claim 1, wherein one port pair of a switch unit is singled out for a special purpose that makes mandatory the pair's involvement in the internal interconnections of the switch unit.

5. A network as claimed in claim 4, wherein the mandatory port pair in the switch unit is dedicated to a station, and so that the network is not disturbed by the connection to or disconnection from that pair of the station connectable to it, there may, in the effective absence of the station, be made a direct connection between the pair's OUT and IN ports so as to bridge the two and thus bypass the normal, indirect, connection via the OUT and IN channels.

6. A network as claimed in claim 4, wherein, where a switch unit includes a port pair whose inclusion is mandatory, then the unit's internal interconnection capability ensures that that particular port pair is connectable to any of the other port pairs, and this is achieved by arranging the notional sequence of port pairs such that any mandatory pair is at either the beginning or the end, whereby, provided that the OUT port of any port pair can indeed be internally interconnected with the IN port of any of the port pairs sequentially nearer the mandatory pair, and that the OUT port of the mandatory port pair can be connected to the IN port of any non-mandatory port pair, then each mandatory port pair will always be included.

7. A network as claimed in claim 1, wherein each switch unit has four communication IN/OUT port pairs one of which is mandatory, which unit comprises:

(a) switching means associated with each IN/OUT port pair, each of which switching means functions as a multiway switch having a wiper blade connected to a centre contact and moveable into engagement with any one of a multiplicity of outer contacts so as to connect the centre contact thereto, the centre contact being connected to the OUT port of the port pair and the outer contacts being connected, one each, to the IN port of the same port pair and to the IN ports of the relevant other port pairs, with the proviso that the connections to the IN port of the mandatory port pair are made via a common switching means allowing the connections to be made instead to the OUT port of the mandatory port pair, whereby by appropriately setting the switching means the OUT port of any port pair may be connected through the wiper blade to the IN port of any relevant port pair;

(b) control means for determining for each switching means with which of the outer contacts the wiper is to be engaged, and thus to which of the IN ports the switching means' centre contact is to be connected, and for determining for the mandatory port pair bypass switching means whether the connections to its IN port are made instead to the OUT port; and, (c) signal detect means associated with the IN port of each non-mandatory port pair and providing data to the control means in dependence upon which is in part made the determination of which contacts are to be connected.

8. A network as claimed in claim 7, wherein there is a "query-connect" signal generator, and, in addition to the outer contacts connected to the IN ports of the relevant port pairs, each switch unit wiperblade-analogue switching means has two extra outer contacts connected one each to the "query-connect" signal generator and to nothing.

9. A network as claimed in claim 8, wherein, for each switch unit, there is a "start-up" generator, and, if there is no mandatory port pair then there is for each switching means an extra outer contact connected to the "start-up" signal generator, while if there is a mandatory port pair then only its switching means need an outer contact connectable to the "start-up" signal generator.

10. A network as claimed in claim 7, wherein each switch unit includes, associated with its mandatory port pair, a separate control port through which may be sent control signals from any station connected via the communications pathway to the mandatory port pair.

11. A network as claimed in claim 1, wherein, in order that the introduction or removal of a station at the mandatory port pair of a switch unit should not disturb the network, switching means are included, associated with that port pair, allowing there to be made a direct connection between the pair's OUT and IN ports so as to bridge the two and thus bypass the port pair, and the bypass is associated with signal delay means to replace any delay inherently introduced by the station and the pathway leading thereto.

12. A network as claimed in claim 1, wherein, in the case of the mandatory port pair in each switch unit, the external and internal sides of each port are separated both physically and electrically by placing a switched connecting link between the two, whereby it is possible to bridge the inner sides of the two ports while at the same time disconnecting the link between the inner and outer sides of either or both ports.

13. A network as claimed in claim 7, wherein the control means for determining how each switch unit switching means is to be set—and thus how the switch unit is to be internally interconnected—comprises a device capable of storing, and recalling, a collection of predetermined combinations of switching means settings.

14. A network as claimed in claim 13, wherein the particular combination of switching means settings that is recalled is determined in part by the output states of the signal detect means and in part by control signals from any station at the other end of the communication pathway connected to the switching unit's mandatory port pair.

15. A network as claimed in claim 1, wherein the switch unit is a repeater unit, and thus, within each repeater unit: there is for each IN port an amplifier by which it is connected to the appropriate outer contacts of each of the switching means, and there is for each OUT port another amplifier by which it is connected to the centre contact of the associated switching means; and positioned inboard of each IN port there is a signal regenerator.

16. A method of configuring a network which includes a multiplicity of interconnected switch units and which incorporates a number of stations connected thereinto each via a switch unit, wherein each switch unit has a plurality of communication port pairs each comprising an OUT and an IN port, each of at least one unit having at least three such pairs;

via their respective port pairs, each switch unit is connected to at least one other switch unit by a communication path, there being at least one path to each such other unit, each path comprising an OUT and an IN channel, each of at least one unit being so connected by at least three paths to other units; and for each switch unit its OUT and IN ports are internally interconnectable such that if there is not port pair that must be involved in this interconnection, and is thus a mandatory pair, then the OUT port of any pair can be connected to the IN port of any pair, while if there is such a mandatory port pair then the unit's port pairs are in a notional sequence with the mandatory pair at one end, and the OUT port of any non-mandatory pair can at least be connected either to the IN port of that pair or to the IN port of any of the port pairs sequentially nearer the mandatory pair, and the OUT port of the mandatory port pair can be connected to the IN port of any non-mandatory pair;

whereby with the provisos above, the switch units are capable of being interconnected via their non-mandatory port pairs one with another in an entirely arbitrary arrangement, and regardless of the actual physical-disposition interconnection arrangement of the units relative one to another the network may be configured as a ring by suitably internally interconnecting each such unit's communication port pairs so as to form a circular communications link serially joining all of the units in the network; and wherein in operation there are employed both channels of each of the communication paths that are used in the configured network, in which method: one particular station being abitrarily designated the primary station, and being connected into the network by its own switch unit, it causes that unit to poll the unit's port pairs in sequence to see whether each is connected by a communication path to another device and if any such device replies then that device is connected into the network along that communication path and subsequently caused similarly to poll its own port pairs, if any, in sequence, this occurring before the preceding device polls its sequentially next port pair, and so on until all the repeater units and stations and the communication paths therebetween have been tested, found either acceptable, faulty or absent, and if the first linked into the network so as electrically to connect the devices and the communication paths therebetween into a closed ring.

17. A method as claimed in claim 16 for configuring a network wherein the repeater units have no mandatory port pairs, and wherein one particular station is abitrarily designated the primary station, and is connected into the network by a repeater unit correspondingly designated the primary repeater unit, all other stations, and all other repeater units, then being designated secondary, in which method:

A (1) the primary station initiates operation of the network by transmitting to its repeater unit a "query-connect" signal, and awaits an acknowledgement, in the form of the same signal, from its repeater unit;

A (2) upon receipt of the acknowledgement the primary station then transmits to its repeater unit a start-up signal, and awaits an acknowledgement, in the form of the same signal, from its repeater unit; and A (3) when the primary station receives the latter acknowledgement the network is configured;

(B) upon receipt by a repeater unit of a query-connect signal at the IN port of any port pair, either B (1) if the unit is neither receiving nor transmitting any other signals, then the unit transmits an acknowledgement, in the form of the same signal, to the OUT port of the same port pair, and awaits a "start-up" signal at the IN port, or (2) if the unit is receiving or transmitting any other signals, then (i) if this query-connect signal has been received at the IN port of a port pair to the OUT port of which the unit is already transmitting the query-connect signal, then the unit connects the IN port of the sequentially last active port pair (an "active port pair" is a port pair at which the unit received the start-up signal and did not loop the pair back by connecting its IN port to its OUT port) to that OUT port, transmits instead the "start-up" signal to that OUT port, and awaits an acknowledgement, in the form of the same signal, at the IN port; or (ii) if the query-connect signal has been received at the IN port of a port pair to the OUT port of which the unit is not transmitting any signal then the unit connects this IN port to this OUT port, so looping back the pair, and marks the pair as used;

(C)-upon receipt by a repeater unit of a start-up signal at the IN port of any non-looped-back port pair the unit either C (1) transmits a query-connect signal to the OUT port of the sequentially-next unused (non-looped-back) port pair, and awaits an acknowledgement, in the form of the same signal, at the IN port of that port pair, and if within a predetermined time there is no such acknowledgement then the unit loops back the chosen port pair, transmits the query-connect signal to the OUT port of the following sequentially next used non-mandatory port pair, and awaits the acknowledgement at the IN port of that port pair, this stage being repeated until there is an acknowledgement, or C (2) if the sequentially-next non-looped-back port pair is that original port pair at the IN port of which the unit first received the start-up signal, connects the IN port of the last active port pair to the OUT port of that original port pair.

18. A method as claimed in claim 16 for configuring a network wherein the repeater units do have mandatory port pairs, and these are used to make connections to all the stations, and wherein one particular station is arbitrarily designated the primary station, and is connected into the network by a repeater unit correspondingly designated the primary repeater unit, all other stations, and all other repeater units, then being designated secondary, in which method:

A (1) the primary station initiates operation of the network by transmitting on a control path to its repeater unit an "initialize" signal, causing the unit to begin a port pair polling process similar to that described above for a non-mandatory port pair repeater unit upon receipt of the start-up signal from its station, and A (2) when the primary repeater unit receives the start-up signal at the IN port of the final sequentially-last active port pair, here an "active port pair" is a port pair at which the unit received the start-up signal and did not loop the pair back by connecting its IN port to its OUT port, or a pair which is the mandatory port pair, it connects that port to the OUT port of the mandatory port pair leading to the primary station, it connects the IN port of this mandatory port to the OUT port of the sequentially-first active port pair, and the network is configured;

(B) upon receipt by the repeater unit of a query-connect signal at the IN port of any non-mandatory port pair, B (1) if the unit is neither receiving nor transmitting any other signals, then the unit transmits an acknowledgement, in the form of the same signal, to the OUT port of the same port pair, and awaits a "start-up" signal at the IN port, else B (2) if the unit is receiving or transmitting any other signals, then
  (i) if this query-connect signal has been received at the IN port of a port pair to the OUT port of which the unit is already transmitting the query-connect signal then the unit connects the IN port of the sequentially last active port pair, at which it received the start-up signal and did not loop the pair back, to that OUT port, and where that IN port belongs to a mandatory port pair, connects the mandatory pair's OUT port to the IN port of the sequentially-previous active port pair, transmits instead the "start-up" signal to that OUT port, and awaits an acknowledgment in the form of the same signal, at the IN port; or
  (ii) if this query connect signal has been received at the IN port of a port pair to the OUT port of which the unit is not transmitting any signal then the unit connects this IN port to this OUT port, so looping back the pair, and marks the pair as used;

(C) upon receipt by a repeater unit of a start-up signal at the IN port of any non-looped-back, non-mandatory port pair the unit either C (1) transmits a query-connect signal to the OUT port of the sequentially-next non-looped-back non-mandatory port pair, and awaits an acknowledgement, in the form of the same signal, at the IN port of that port pair, and
  if within a predetermined time there is no such acknowledgment then the unit loops back the chosen port pair, transmits the query-connect signal to the OUT port of the following sequentially-next unused non-mandatory port pair, and awaits the acknowledgement at the IN port of that port pair, this stage being repeated until there is an acknowledgement; or C (2) if the sequentially-next non-looped-back non-mandatory port pair is that original port pair at the IN port of which the unit first received the start-up signal, connects the IN port of the sequentially-last active port pair to the OUT port of the original port pair via the OUT and IN port of any intervening mandatory port pair.

19. A method as claimed in claim 16, in which, in order to prevent all stations trying to initiate configuration at once, it is arranged that upon switching on the network, or upon the discovery during operation of an error state necessitating reconfiguration, each station be programmed to attempt configuration initiation after a time the length of which depends upon the station, whereby, if all these time lengths are sufficiently different, then it will always be the remaining station with the shortest time out period that initiates configuration.

20. Switch units suitable for use in a communications network which includes a multiplicity of interconnected switch units, wherein;
  each switch unit has a plurality of communication port pairs each comprising an OUT and an IN port, each of at least one unit having at least three such pairs;
  via their respective port pairs, each switch unit is connected to at least one other switch unit by a communication path, there being at least one path to each such other unit, each path comprising an OUT and an IN channel, each of at least one unit being so connected by at least three paths to other units; and
  for each switch unit its OUT and IN ports are internally interconnectable such that
    if there is not port pair that must be involved in this interconnection, and is thus a mandatory pair, then the OUT port of any pair can be connected to the IN port of any pair,
    while if there is such a mandatory port pair then the unit's port pairs are in a notional sequence with the mandatory pair at one end, and the OUT port of any non-mandatory pair can at least be connected either to the IN port of that pair or to the IN port of any of the port pairs sequentially nearer the mandatory pair, and the OUT port of the mandatory port pair can be connected to the IN port of any non-mandatory pair;
  whereby with the provisos above, the switch units are capable of being interconnected via their non-mandatory port pairs one with another in an entirely arbitrary arrangement, and regardless of the actual physical-disposition interconnection arrangement of the units relative one to another the network may be configured as a ring by suitably internally interconnecting each such unit's communication port pairs so as to form a circular communications link serially joining all of the units in the network;

wherein in operation there are employed both channels of each of the communication paths that are used in the configured network, and wherein in operation there are employed both channels of each of the communication paths that are used in the configured network, and wherein each switch unit has four communications IN/OUT port pairs, one of which is mandatory, which unit includes (a) switching means associated with each IN/OUT port pair, each of which switching means may be regarded as being notionally a multiway switch having a wiper blade connected to a centre contact and moveable into engagement with any one of a multiplicity of outer contacts so as to connect the centre contact thereto, the centre contact being connected to the OUT port of the port pair and the outer contacts being connected, one each, to the IN port of the same port pair and to the IN ports of the relevant other port pairs, with the proviso that the connections to the IN port of the mandatory port pair are made via a common switching means allowing the connections to be made instead to the OUT port of the mandatory port pair, whereby by appropriately setting the switching means the OUT port of any port pair may be connected through the wiper blade to the IN port of any relevant port pair;

(b) control means for determining for each switching means with which of the outer contacts the wiper is to be engaged, and thus to which of the IN ports the switching means' centre contact is to be connected, and for determining for the mandatory port pair bypass switching means whether the connections to its IN ports are made instead to the OUT port; and (c) signal detect means associated with the IN port of each non-mandatory port pair and providing data to the control means in dependence upon which is in part made the determination of which contacts are to be connected.

21. A communications network, comprising:
a plurality of switch units, each having a plurality of first port pairs, each first port pair having an IN port and an OUT port, each switch unit additionally having interconnection means for selectively connecting the OUT ports of the first port pairs to the IN ports of the first port pairs in a predetermined pattern;
a station;
a further switch unit having a plurality of first port pairs and a second port pair that is connectable to the station, each of the first and second port pairs having an IN port and an OUT port, the further switch unit additionally having interconnection means for selectively connecting the OUT port of the first and second port pairs to the IN ports of the first port pairs and to an intermediate connection point associated with the second port pair in a predetermined pattern, and bypass means for connecting the intermediate connection point to the IN port of the second port pair when the station is connected to the second port pair and for connecting the intermediate connection point to the OUT port of the second port pair when the station is disconnected from the second port pair; and means for interconnecting the first port pairs of the switch units so that each switch unit is connected to at least one other switch unit by a communication path, each path including an OUT channel and an IN channel, wherein the first port pairs of the switch units are selectively connected by their respective interconnection means to configure the network as a ring network which serially links all of the switch units, and wherein both channels of all communication paths that are used in the configured network are employed to convey information.

22. The network of claim 21, wherein a majority of the switch units in the network have a second port pairs that are connectable to respective stations, and have respective intermediate connection points and bypass means for connecting the respective interconnection point to one of the IN and OUT ports of the second port pair so that the respective station can be disconnected without reconfiguring the network.

23. The network of claim 22, wherein each switch unit with a second port pair further comprises control means cooperating with the interconnection means for determining the pattern by which the OUT ports are connected to the IN ports and the intermediate connection point, and signal detect means associated with the IN port of each first port pair for providing data to the control means.

24. The network of claim 22, wherein each network with a second port pair further comprises a query-connect signal generator, and means for selectively connecting the query-connect signal generator to the OUT ports of the first port pairs.

25. The network of claim 24, wherein each switch unit with a second port pair further comprises a start-up generator, and means for selectively connecting the start-up generator to a port of the second port pair.

* * * * *